United States Patent
Mochizuki et al.

(10) Patent No.: US 10,297,859 B2
(45) Date of Patent: May 21, 2019

(54) ALL-SOLID-STATE SECONDARY BATTERY, SOLID ELECTROLYTE COMPOSITION AND ELECTRODE SHEET FOR BATTERIES USED IN THE SAME, AND MANUFACTURING METHOD OF ELECTRODE SHEET FOR BATTERIES AND ALL-SOLID-STATE SECONDARY BATTERY

(71) Applicant: FUJIFILM Corporation, Tokyo (JP)

(72) Inventors: Hiroaki Mochizuki, Kanagawa (JP); Tomonori Mimura, Kanagawa (JP); Masaomi Makino, Kanagawa (JP); Katsuhiko Meguro, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 71 days.

(21) Appl. No.: 15/272,644

(22) Filed: Sep. 22, 2016

(65) Prior Publication Data

US 2017/0237115 A1    Aug. 17, 2017

Related U.S. Application Data

(63) Continuation of application No. PCT/JP2015/059677, filed on Mar. 27, 2015.

(30) Foreign Application Priority Data

Mar. 28, 2014 (JP) ................................. 2014-070092

(51) Int. Cl.
*H01M 10/056* (2010.01)
*C08B 3/10* (2006.01)
(Continued)

(52) U.S. Cl.
CPC ............ *H01M 10/056* (2013.01); *C08B 3/08* (2013.01); *C08B 3/10* (2013.01); *C08B 11/02* (2013.01);
(Continued)

(58) Field of Classification Search
CPC combination set(s) only.
See application file for complete search history.

(56) References Cited

U.S. PATENT DOCUMENTS

| 2002/0076617 | A1* | 6/2002 | Kezuka | .................. H01M 4/133 |
| | | | | 429/306 |
| 2008/0081257 | A1* | 4/2008 | Yoshida | .................. H01M 6/18 |
| | | | | 429/209 |

(Continued)

FOREIGN PATENT DOCUMENTS

| JP | 2001-126757 A | 5/2001 |
| JP | 2002-042862 A | 2/2002 |

(Continued)

OTHER PUBLICATIONS

Polymer Science Learning Center (University of Mississippi). http://www.pslc.ws/macrog/cell.htm. Apr. 2002. (Year: 2002).*

(Continued)

*Primary Examiner* — Jonathan G Leong
*Assistant Examiner* — Christopher P Domone
(74) *Attorney, Agent, or Firm* — Sughrue Mion, PLLC

(57) ABSTRACT

An all-solid-state secondary battery includes a positive electrode active substance layer; a negative electrode active substance layer; and an inorganic solid electrolyte layer, in which at least one of the positive electrode active substance layer, the negative electrode active substance layer, or the inorganic solid electrolyte layer contains an inorganic solid electrolyte having conductivity of ions of metal belonging to Group 1 or 2 of the periodic table and a cellulose polymer.

18 Claims, 1 Drawing Sheet

(51) Int. Cl.

| | | |
|---|---|---|
| *C08B 11/16* | (2006.01) | |
| *C08B 3/08* | (2006.01) | |
| *H01M 10/0525* | (2010.01) | |
| *C08B 11/02* | (2006.01) | |
| *H01M 10/0562* | (2010.01) | |
| *H01M 4/04* | (2006.01) | |
| *H01M 4/131* | (2010.01) | |
| *H01M 4/133* | (2010.01) | |
| *H01M 4/134* | (2010.01) | |
| *H01M 4/1391* | (2010.01) | |
| *H01M 4/1393* | (2010.01) | |
| *H01M 4/1395* | (2010.01) | |
| *H01M 4/62* | (2006.01) | |
| *H01M 4/66* | (2006.01) | |
| *H01M 10/058* | (2010.01) | |
| *C08B 11/193* | (2006.01) | |
| *C08B 13/00* | (2006.01) | |
| *C08B 15/06* | (2006.01) | |
| *C09J 101/02* | (2006.01) | |
| *C08L 1/02* | (2006.01) | |
| *C08L 1/10* | (2006.01) | |
| *C08L 1/26* | (2006.01) | |
| *C08L 1/32* | (2006.01) | |
| *H01M 10/04* | (2006.01) | |

(52) U.S. Cl.
CPC ............ *C08B 11/16* (2013.01); *C08B 11/193* (2013.01); *C08B 13/00* (2013.01); *C08B 15/06* (2013.01); *C08L 1/02* (2013.01); *C08L 1/10* (2013.01); *C08L 1/26* (2013.01); *C08L 1/32* (2013.01); *C09J 101/02* (2013.01); *H01M 4/0404* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/622* (2013.01); *H01M 4/661* (2013.01); *H01M 10/058* (2013.01); *H01M 10/0525* (2013.01); *H01M 10/0562* (2013.01); *H01M 10/0427* (2013.01); *H01M 2300/0068* (2013.01); *H01M 2300/0071* (2013.01); *H01M 2300/0091* (2013.01); *Y02T 10/7011* (2013.01)

(56) References Cited

U.S. PATENT DOCUMENTS

| | | | |
|---|---|---|---|
| 2011/0177397 A1 | 7/2011 | Ogasa | |
| 2013/0266842 A1 | 10/2013 | Woehrle et al. | |
| 2014/0011080 A1* | 1/2014 | Lee | H01M 10/0565 429/200 |
| 2016/0240831 A1* | 8/2016 | Zeng | H01M 2/1686 |

FOREIGN PATENT DOCUMENTS

| | | |
|---|---|---|
| JP | 2011-134675 A | 7/2011 |
| JP | 2011-150817 A | 8/2011 |
| JP | 2013-8611 A | 1/2013 |
| JP | 2013-532361 A | 8/2013 |
| JP | 2014-029791 A | 2/2014 |
| WO | 2013/065738 A2 | 5/2013 |
| WO | 2014/020654 A1 | 7/2016 |

OTHER PUBLICATIONS http://www1.lsbu.ac.uk/water/carboxynnethylcellulose.html. London South Bank University. 2000. (Year: 2000).*
International Search Report for PCT/JP2015/059677 dated Jun. 30, 2015.

* cited by examiner

ALL-SOLID-STATE SECONDARY BATTERY, SOLID ELECTROLYTE COMPOSITION AND ELECTRODE SHEET FOR BATTERIES USED IN THE SAME, AND MANUFACTURING METHOD OF ELECTRODE SHEET FOR BATTERIES AND ALL-SOLID-STATE SECONDARY BATTERY

CROSS-REFERENCE TO RELATED APPLICATIONS

This application is a Continuation of PCT International Application No. PCT/JP2015/059677 filed on Mar. 27, 2015, which claims priority under 35 U.S.C. § 119 (a) to Japanese Patent Application No. 2014-070092 filed in Japan on Mar. 28, 2014. Each of the above applications is hereby expressly incorporated by reference, in its entirety, into the present application.

BACKGROUND OF THE INVENTION

1. Field of the Invention

The invention relates to an all-solid-state secondary battery, a solid electrolyte composition and an electrode sheet for batteries used in the same, and manufacturing methods of an electrode sheet for batteries and an all-solid-state secondary battery.

2. Description of the Related Art

An electrolyte solution is used in lithium ion batteries which are currently widely used in many cases. There have been attempts to make all configuration materials be solid by substituting the electrolyte solution with a solid electrolyte. Above all, one of the advantages of the technique of using an inorganic solid electrolyte is reliability. In the electrolyte solution which is used in a lithium ion secondary battery, a combustible material such as a carbonate-based solvent is applied as a medium thereof. Various countermeasures are employed, but an additional countermeasure to be performed when a battery is overcharged is desired. An all-solid-state secondary battery formed of inorganic compounds that allow an electrolyte to be incombustible is regarded as solving means thereof. Another advantage is that an inorganic solid electrolyte exhibits higher ion conductivity than a polymer electrolyte.

Another advantage of the all-solid-state secondary battery is that a high energy density is suitably achieved by stacking electrodes. Specifically, the all-solid-state secondary battery can be a battery having a structure in which electrodes and electrolytes are directly arranged side by side to be serialized. At this point, a metal package that seals battery cells and copper wire or bus bars that connect battery cells can be omitted, and thus energy density of the battery can be greatly increased. It is advantageous that compatibility with a positive electrode material in which a potential can be enhanced to a high level is good.

According to the respective advantages as described above, the development of an all-solid-state secondary battery as a next-generation lithium ion secondary battery has been energetically advanced (see NEDO: New Energy and Industrial Technology Development Organization, Fuel Cells•Hydrogen Technology Development Field, Electricity Storage Technology Development Division "NEDO 2013 Roadmap for the Development of Secondary Battery Technology" (August 2013)). Meanwhile, an inorganic all-solid-state secondary battery has disadvantages caused by the fact that the electrolyte thereof is a hard solid. Examples thereof include increase of resistance on an interface between solid particles. In order to solve this problem, there are examples in which specific polymer compounds are used as binders. Specifically, in JP2013-008611A, a surfactant utilizing a polyoxyethelene chain is used. JP2011-134675A discloses the use of a hydrogenated butadiene copolymer. JP2002-042862A discloses a lithium ion secondary battery obtained by impregnating sulfolane in a gap between an active substance and an oxide-based inorganic solid electrolyte.

SUMMARY OF THE INVENTION

According to the techniques of JP2013-008611A, JP2011-134675A, and JP2002-042862A, the increase of the interface resistance or heat resistance in an all-solid-state secondary battery may be somewhat ameliorated. However, the binders consisting of polymer compounds disclosed in the documents above may not meet the high standards currently required and new improvements therein are required.

Therefore, an object of the invention is to provide an all-solid-state secondary battery, in which high ion conductivity is realized regardless of the pressurization between the active substance layer and the inorganic solid electrolyte layer, and more satisfactory binding properties of a material are realized in the all-solid-state secondary battery, a solid electrolyte composition and an electrode sheet for batteries using the same, and manufacturing methods of an all-solid-state secondary battery.

The problems described above are solved by the means below.

[1] An all-solid-state secondary battery, comprising: a positive electrode active substance layer; a negative electrode active substance layer; and an inorganic solid electrolyte layer, in which at least one of the positive electrode active substance layer, the negative electrode active substance layer, or the inorganic solid electrolyte layer contains an inorganic solid electrolyte having conductivity of ions of metal belonging to Group 1 or 2 of the periodic table, and a cellulose polymer.

[2] The all-solid-state secondary battery according to [1], in which cellulose polymer has a repeating unit represented by Formula (1) below.

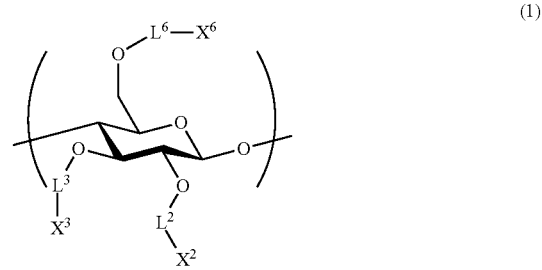

$L^2$, $L^3$, and $L^6$ each independently represent a single bond or a divalent linking group.

$X^2$, $X^3$, and $X^6$ each independently represent a hydrogen atom, a hydrocarbon group having 1 to 30 carbon atoms, or a hydrocarbon group including a hetero atom and having 1 to 30 carbon atoms.

[3] The all-solid-state secondary battery according to [2], in which at least one of $L^2$, $L^3$, or $L^6$ is a divalent linking group.

[4] The all-solid-state secondary battery according to [2] or [3], in which $L^2$, $L^3$, and $L^6$ each independently represent a single bond, a carbonyl group, a carbonyloxy group, or an amide group.

[5] The all-solid-state secondary battery according to any one of [1] to [4], in which a total degree of substitution of a hydroxyl group of the cellulose polymer is 0.3 or greater.

[6] The all-solid-state secondary battery according to any one of [1] to [5], in which 0.1 parts by mass to 10 parts by mass of the cellulose polymer is contained with respect to 100 parts by mass of the inorganic solid electrolyte.

[7] The all-solid-state secondary battery according to any one of [1] to [6], in which the inorganic solid electrolyte layer is a layer containing the inorganic solid electrolyte and the cellulose polymer.

[8] The all-solid-state secondary battery according to any one of [1] to [7], in which the negative electrode active substance layer or the positive electrode active substance layer is a layer containing the inorganic solid electrolyte and the cellulose polymer.

[9] The all-solid-state secondary battery according to any one of [1] to [8], in which the inorganic solid electrolyte is an oxide-based inorganic solid electrolyte.

[10] The all-solid-state secondary battery according to [9], in which the inorganic solid electrolyte is selected from a compound of a formula below:

$Li_{xa}La_{ya}TiO_3$ $xa=0.3$ to 0.7, $ya=0.3$ to 0.7, $Li_7La_3Zr_2O_{12}$, $Li_{3.5}Zn_{0.25}GeO_4$, $LiTi_2P_3O_{12}$, $Li_{1+xh+yh}(Al,Ga)_{xh}(Ti,Ge)_{2-xh}Si_{yh}P_{3-yh}O_{12}$ $0 \leq xh \leq 1$, $0 \leq yh \leq 1$, $Li_3PO_4$, LiPON, $LiPOD^1$ $D^1$ is at least one type selected from Ti, V, Cr, Mn, Fe, Co, Ni, Cu, Zr, Nb, Mo, Ru, Ag, Ta, W, Pt, or Au, and $LiA^1ON$ $A^1$ is at least one type selected from Si, B, Ge, Al, C, or Ga.

[11] A solid electrolyte composition comprising: an inorganic solid electrolyte having conductivity of ions of metal belonging to Group 1 or 2 of the periodic table and a binder constituted with a cellulose polymer represented by Formula (1) below.

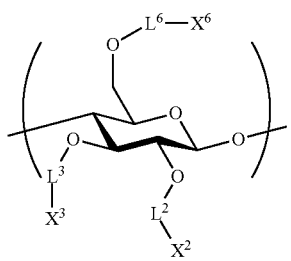
(1)

$L^2$, $L^3$, and $L^6$ each independently represent a single bond or a divalent linking group.

$X^2$, $X^3$, and $X^6$ each independently represent a hydrogen atom, a hydrocarbon group having 1 to 30 carbon atoms, or a hydrocarbon group including a hetero atom and having 1 to 30 carbon atoms.

[12] The solid electrolyte composition according to [11], in which at least one of $L^2$, $L^3$, or $L^6$ is a divalent linking group.

[13] The solid electrolyte composition according to [11] or [12], in which at least one of $X^2$, $X^3$, or $X^6$ is a hydrocarbon group having 3 or more carbon atoms or a hydrocarbon group including a hetero atom and having 1 to 30 carbon atoms.

[14] The solid electrolyte composition according to any one of [11] to [13], in which $L^2$, $L^3$, and $L^6$ each independently represent a single bond, a carbonyl group, a carbonyloxy group, or an amide group.

[15] The solid electrolyte composition according to any one of [11] to [14], further comprising: a dispersion medium.

[16] An electrode sheet for batteries, in which a film is formed with the solid electrolyte composition according to any one of [11] to [15], on a metal foil.

[17] A manufacturing method of an electrode sheet for batteries, comprising: forming a film by arranging the solid electrolyte composition according to any one of [11] to [15], on a metal foil.

[18] A manufacturing method of an all-solid-state secondary battery, comprising: manufacturing an all-solid-state secondary battery by the manufacturing method according to [17].

In this specification, when there are plural substituents or linking groups indicated with specific reference symbols, or plural substituents or the like (in the same manner as in the definition of the number of substituents) are simultaneously or alternatively defined, the respective substituents may be identical to or different from each other. When the plural substituents and the like are in vicinity to each other, those may be bonded or condensed to each other to form a ring.

The all-solid-state secondary battery according to the invention realizes high ion conductivity regardless of the pressurization between the active substance layer and the inorganic solid electrolyte layer, and further realizes satisfactory binding properties of a material.

If the solid electrolyte composition, the electrode sheet for batteries, and the manufacturing method of the all-solid-state secondary battery of the invention are used, the all-solid-state secondary battery exhibiting excellent performances described above can be suitably manufactured.

Aforementioned and additional features and advantages are clearly presented from the following descriptions suitably referring to the accompanying drawings.

DESCRIPTION OF THE PREFERRED EMBODIMENTS

The all-solid-state secondary battery according to the invention include a positive electrode active substance layer, a negative electrode active substance layer, and an inorganic solid electrolyte layer, and any one of the layers contains an ion conductive inorganic solid electrolyte and a cellulose polymer. Hereinafter, preferred embodiments are described with reference to the drawings.

Figure 1:
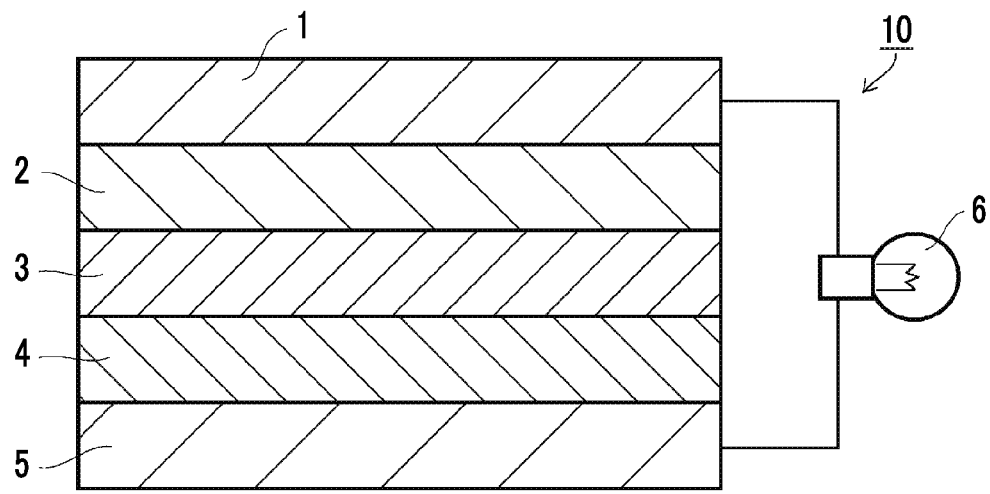
FIG. 1 is a cross-sectional view schematically illustrating an all-solid-state lithium ion secondary battery according to a preferred embodiment of the invention.

FIG. 1 is a sectional view schematically illustrating an all-solid-state secondary battery (lithium ion secondary battery) according to a preferred embodiment of the invention. An all-solid-state secondary battery 10 according to the embodiment includes a negative electrode collector 1, a negative electrode active substance layer 2, an inorganic solid electrolyte layer 3, a positive electrode active substance layer 4, and a positive electrode collector 5, in this sequence, from the negative electrode side. The respective layers are in contact with each other, and form a laminate structure. If this structure is employed, when the battery is charged, electrons ($e^-$) are supplied to a negative electrode side and lithium ions ($Li^+$) are accumulated thereto. Meanwhile, when the battery is discharged, the lithium ions ($Li^+$) accumulated in the negative electrode are returned to the positive electrode side, and electrons are supplied to an operating site 6. In the illustrated example, a bulb is employed in the operating site 6, and the bulb is turned on by the discharge. The solid electrolyte composition according to the invention is preferably used as a configuration material of the negative electrode active substance layer, the positive electrode active substance layer, and the inorganic solid electrolyte layer. Among them, the inorganic solid electrolyte composition according to the invention is preferably used as a configuration material of all of the inorganic solid electrolyte layer, the positive electrode active substance layer, and the negative electrode active substance layer. The positive electrode active substance layer and the negative electrode active substance layer are collectively referred to as "active substance layers". The inorganic solid electrolyte layer may be referred to as a "solid electrolyte layer" or an "electrode layer".

The thicknesses of the positive electrode active substance layer 4 and the negative electrode active substance layer 2 can be determined according to desired battery capacity. If dimensions of a general element is considered, the thickness is preferably 1 μm or greater and more preferably 3 μm or greater. The upper limit thereof is preferably 1,000 μm or less and more preferably 400 μm or less.

Meanwhile, it is desirable that the inorganic solid electrolyte layer 3 is as thin as possible, while a short circuit of positive and negative electrodes is prevented. It is preferable to prominently exhibit the effect of the invention, and specifically, the thickness is preferably 1 μm or greater and more preferably 3 μm. The upper limit thereof is preferably 1,000 μm or less and more preferably 400 μm or less.

In FIG. 1, as described above, a laminate consisting of the collector, the active substance layer, and the solid electrolyte layer are referred to as an "all-solid-state secondary battery". However, in order to make the laminate into a product, this laminate is stored in a housing (case) as a secondary electrode sheet for batteries, to be an all-solid-state secondary battery (for example, a coin battery or laminate battery).

<Solid Electrolyte Composition>

The solid electrolyte composition according to the invention refers to a composition including an inorganic solid electrolyte and can be used as a material for forming at least one of an inorganic solid electrolyte layer, a positive electrode active substance layer, or a negative electrode active substance layer of the all-solid-state secondary battery. The solid electrolyte composition is not limited to be solid, and may be a liquid state or a paste state.

(Inorganic Solid Electrolyte)

The inorganic solid electrolyte is an inorganic solid electrolyte. In this specification, a solid electrolyte means a solid-state electrolyte of which ions can move inside. In this point of view, considering the distinction from electrolyte salt (a supporting electrolyte), the inorganic solid electrolyte may be called an ion conductive inorganic solid electrolyte. The ion conductivity of the inorganic solid electrolyte is not particularly limited. With respect to the lithium ion, the ion conductivity is preferably $1 \times 10^{-6}$ S/cm or greater, more preferably $1 \times 10^{-5}$ S/cm or greater, even more preferably $1 \times 10^{-4}$ S/cm or greater, and particularly preferably $1 \times 10^{-3}$ S/cm or greater. The upper limit thereof is not particularly limited, but 1 S/cm or less is practical. Unless described otherwise, the measuring method of the ion conductivity is performed under non-pressurized condition measured in examples below.

The inorganic solid electrolyte is clearly differentiated from an organic solid electrolyte (a polymer electrolyte represented by polyethylene oxide (PEO) or the like, an organic electrolyte salt represented by LiTFSI or the like), since a polymer compound or an organic product such as complex salt is not included as an electrolyte. Since the inorganic solid electrolyte is a non-dissociative solid in a normal state, cations and anions are not decomposed or separated even in the liquid. In this point of view, the inorganic solid electrolyte is clearly differentiated from inorganic electrolyte salt ($LiPF_6$, $LiBF_4$, LiFSI, LiCl, or the like) in which cations and anions are decomposed or separated in the electrolysis liquid or the polymer. It is general that, the inorganic solid electrolyte has conductivity of ions of metal belonging to Group 1 or 2 of the periodic table (preferably lithium ions) but does not have electron conductivity.

According to the invention, an inorganic solid electrolyte of the conductivity of the ions (preferably, a lithium ion) of metal belonging to Group 1 or 2 in the periodic table is contained in the electrolyte layer or the active substance layer. As the inorganic solid electrolyte, a solid electrolyte material that is applied to this kind of product can be appropriately selected to be used. Representative examples of the inorganic solid electrolyte include (i) a sulfide-based inorganic solid electrolyte (also referred to as a sulfide solid electrolyte) and an (ii) oxide-based inorganic solid electrolyte (also referred to as an oxide solid electrolyte).

(i) Sulfide-based Inorganic Solid Electrolyte

It is preferable that the sulfide-based solid electrolyte contains a sulfur atom (S), has ion conductivity of metal belonging to Group 1 or 2 in the periodic table, and has electron insulation properties. Examples thereof include a lithium ion conductive inorganic solid electrolyte satisfying the composition presented in Formula (A) below.

$$L_{a1}M_{b1}P_{c1}S_{d1}A_{e1} \quad (A)$$

(In the formula, L represents an element selected from Li, Na, and K, and Li is preferable. M represents an element selected from B, Zn, Sn, Si, Cu, Ga, Sb, Al, and Ge. Among these, B, Sn. Si, Al, and Ge are preferable, and Sn, Al, and Ge are more preferable. A represents I, Br, Cl, and F, and I and Br are preferable, and I is particularly preferable. a1 to e1 represent compositional ratios of respective elements, and a1:b1:c1:d1:e1 satisfies 1 to 12:0 to 1:1:2 to 12:0 to 5. a1 is preferably 1 to 9 and more preferably 1.5 to 4. b1 is preferably 0 to 0.5. d1 is preferably 3 to 7 and more preferably 3.25 to 4.5. e1 is preferably 0 to 3 and more preferably 0 to 1.)

In Formula (A), with respect to the compositional ratios of L, M, P, S, and A, it is preferable that b1 and e1 are 0, it is more preferable that b1=0, e1=0, and a ratio of a1, c1, and d1 (a1:c1:d1) is a1:c1:d1=1 to 9:1:3 to 7, and it is even more preferable that b1=0, e1=0, and a1:c1:d1=1.5 to 4:1:3.25 to 4.5. As described below, the compositional ratios of the respect elements can be controlled by adjusting formulation amounts of raw material compounds when the sulfide-based solid electrolyte is manufactured.

The sulfide-based solid electrolyte may be amorphous (glass) or may be crystallized (formed into glass ceramic), or a portion thereof may be crystallized.

In Li—P—S-based glass and Li—P—S-based glass ceramics, the ratio of $Li_2S$ and $P_2S_5$ is preferably 65:35 to 85:15 and more preferably 68:32 to 75:25 in the molar ratio of $Li_2S:P_2S_5$. If the ratio of $Li_2S$ and $P_2S_5$ is in the range described above, lithium ion conductivity can be increased. Specifically, the lithium ion conductivity can be preferably $1 \times 10^{-4}$ S/cm or greater and more preferably $1 \times 10^{-3}$ S/cm or greater. The upper limit thereof is not particularly limited, but $1 \times 10^{-1}$ S/cm or less is practical.

For example, specific examples of the compound include compounds obtained by using raw material compositions containing $Li_2S$ and sulfide of elements of Groups 13 to 15. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among these, crystalline and amorphous raw material compositions consisting of $Li_2S$—$P_2S_5$, $Li_2S$—$GeS_2$—$Ga_2S_3$, $Li_2S$—LiI—$P_2S_5$, $Li_2S$—LiI—$Li_2O$—$P_2S_5$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_3PO_4$—$P_2S_5$, $Li_2S$—$GeS_2$—$P_2S_5$, and $Li_{10}GeP_2S_{12}$ are preferable, since the compositions have high lithium ion conductivity. Examples of the method of synthesizing the sulfide solid electrolyte material by using such a raw material composition include an amorphization method. Examples of the amorphization method include a mechanical milling method and a melt quenching method. Among these, a mechanical milling method is preferable. This is because a treatment in room temperature becomes possible so as to achieve simplification of a manufacturing step.

The sulfide solid electrolyte is more preferably represented by Formula (B) below.

$$Li_l P_m S_n \quad \text{Formula (B)}$$

In the formula, l to n represent compositional ratios of the respective elements, and l:m:n satisfies 2 to 4:1:3 to 10.

(ii) Oxide-Based Inorganic Solid Electrolyte

It is preferable that the oxide-based inorganic solid electrolyte contains oxygen (O), has ion conductivity of metal belonging to Group 1 or 2 in the periodic table, and has electron insulation properties.

For example, specific examples of the compound include $Li_{xa}La_{ya}TiO_3$ [xa=0.3 to 0.7, ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al,Ga)_{yd}(Ti,Ge)_{zd}Si_{ad}P_{md}O_{nd}$ (here, 1≤xd≤3, 0≤yd≤1, 0≤zd≤2, 0≤ad≤1, 1≤md≤7, and 3≤nd≤13), $Li_{(3-2xe)}M^{ee}{}_{xe}D^{ee}O$ (xe represents a number of 0 to 0.1, $M^{ee}$ represents a divalent metal atom, $D^{ee}$ represents a halogen atom or a combination of two or more halogen atoms), $Li_{xf}Si_{yf}O_{zf}$ (1≤xf≤5, 0<yf≤3, and 1≤zf≤10), $Li_{xg}S_{yg}O_{zg}$ (1≤xg≤3, 0<yg≤2, and 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al,Ga)_{xh}(Ti,Ge)_{2-xh}Si_{yh}P_{3-yh}O_{12}$ (here, 0≤xh≤1, and 0≤yh≤1), and $Li_7La_3Zr_2O_{12}$ having a garnet-type crystal structure. A phosphorus compound including Li, P, and O is desirable. Examples thereof include lithium phosphorate ($Li_3PO_4$), LiPON in which a portion of oxygen of lithium phosphorate is substituted with nitrogen, $LiPOD^1$ ($D^1$ is at least one selected from Ti, V, Cr, Mn, Fe, Co, Ni, Cu, Zr, Nb, Mo, Ru, Ag, Ta, W, Pt, Au, or the like). $LiA^1ON$ ($A^1$ is at least one selected from Si, B, Ge, Al, C, Ga, or the like) or the like can be preferably used.

Among these, $Li_{xa}La_{ya}TiO_3$ [xa=0.3 to 0.7, ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_7La_3Zr_2O_{12}$ (LLZ), $Li_3BO_3$, $Li_3BO_3$—$Li_2SO_4$, and $Li_{xd}(Al,Ga)_{yd}(Ti,Ge)_{zd}Si_{ad}P_{md}O_{nd}$ (here, 1≤xd≤3, 0≤yd≤1, 0≤zd≤2, 0≤ad≤1, 1≤md≤7, and 3≤nd≤13) are preferable. These may be used singly or two or more types thereof may be used in combination.

The ion conductivity as the oxide-based inorganic solid electrolyte having lithium ion conductivity is preferably $1 \times 10^{-6}$ S/cm or greater, more preferably $1 \times 10^{-5}$ S/cm or greater, and particularly preferably $5 \times 10^{-5}$ S/cm or greater.

According to the invention, among these, an oxide-based inorganic solid electrolyte is preferably used. Since the oxide-based inorganic solid electrolyte generally has high hardness, the interface resistance easily increases in an all-solid-state secondary battery. If the invention is applied, the effects thereof become prominent. Particularly, it is assumed that the oxide-based inorganic solid electrolyte and an oxygen-containing group (an ether group, a carbonyl group, a hydroxyl group, or the like) included in a cellulose polymer described below work so as to form a more suitable adsorption state. In this point of view, an oxide-based inorganic solid electrolyte is particularly preferably used.

The inorganic solid electrolyte may be used singly or two or more types thereof may be used in combination.

The average particle diameter of the inorganic solid electrolyte is not particularly limited, but the average particle diameter is preferably 0.01 μm or longer and more preferably 0.1 μm or longer. The upper limit thereof is preferably 100 μm or shorter and more preferably 50 μm or shorter.

When compatibility between battery performances and a decrease and maintenance effect of the interface resistance is considered, the concentration of the inorganic solid electrolyte in the solid electrolyte composition is preferably 50 mass % or more, more preferably 70 mass % or more, and particularly preferably 90 mass % or more with respect to 100 mass % of the solid component. In the same point of view, the upper limit of the concentration is preferably 99.9 mass % or less, more preferably 99.5 mass % or less, and particularly preferably 99 mass % or less. However, when the inorganic solid electrolyte is used together with the positive electrode active substance or the negative electrode active substance described below, it is preferable that the sum thereof is in the concentration range described above.

(Cellulose Polymer)

It is preferable that the cellulose polymer according to the invention is used as a binder of the inorganic solid electrolyte. This cellulose polymer preferably has a repeating unit represented by Formula (1) below.

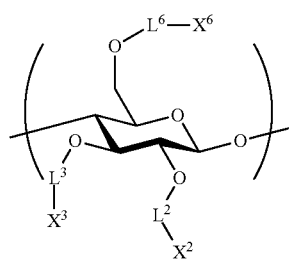

(1)

$L^2$, $L^3$, and $L^6$ each independently represent a single bond or a divalent linking group. As a divalent linking group, a carbonyl group (—CO—), a carbonyloxy group (—COO—), or an amide group (—CONR$^N$—), or a combination thereof is preferable. Among these, $L^2$, $L^3$, and $L^6$ are preferably single bonds, carbonyl groups, or amide groups. Here, $R^N$ represents a hydroxyl group, an alkyl group having 1 to 6 carbon atoms, an aryl group having 6 to 14 carbon atoms, and an aralkyl group having 7 to 15 carbon atoms.

According to one embodiment according to the invention, at least one of $L^2$, $L^3$, or $L^6$ is preferably a divalent linking group. The description of the linking group is preferably a group that becomes a glucose ring on the left side and a substituent X on the right side. For example, when —COO— is described, a relationship of —O—COO—X of a glucose ring is preferable.

$X^2$, $X^3$, and $X^6$ each independently represent a hydrogen atom, a hydrocarbon group having 1 to 30 carbon atoms, or a hydrocarbon group having a hetero atom and having 1 to 30 carbon atoms. When $X^2$, $X^3$, and $X^6$ are hydrocarbon groups, a group having comparatively more carbon atoms is preferable. In one embodiment thereof, the number of carbon atoms is preferably 3 to 30 and more preferably 3 to 20. Accordingly, it is expected to improve binding properties by providing solubility to a solvent without deteriorating high mechanical characteristics derived from a rigid main chain structure of a cellulose skeleton and providing thermal flexibility.

When $X^2$, $X^3$, and $X^6$ represent hydrocarbon groups, an alkyl group (preferably having 1 to 30 carbon atoms and more preferably having 3 to 20 carbon atoms), an alkenyl group (preferably having 2 to 30 carbon atoms and more preferably having 3 to 20 carbon atoms), an alkynyl group (preferably having 2 to 30 carbon atoms and more preferably having 3 to 20 carbon atoms), an aryl group (preferably having 6 to 30 carbon atoms and more preferably having 6 to 22 carbon atoms), and an aralkyl group (preferably having 7 to 30 carbon atoms and more preferably having 7 to 23 carbon atoms) are preferable.

$X^2$, $X^3$, and $X^6$ may have arbitrary substituents T in the range of exhibiting desired effects.

When $X^2$, $X^3$, and $X^6$ are hydrocarbon groups having hetero atoms, a hydrocarbon group in which a portion or all of hydrogen atoms of the hydrocarbon group are substituted with halogen atoms (preferably having 1 to 30 carbon atoms and more preferably having 3 to 20 carbon atoms), a hydrocarbon group having an ether group or a thioether group in which an oxygen atom or a sulfur atom connects carbon atoms (preferably having 1 to 30 carbon atoms and more preferably having 3 to 20 carbon atoms) are preferable. A fluoroalkyl group or an alkylene oxy group in which hydrogen atoms are substituted with fluorine atoms are particularly preferable. In a case where substitutable positions are all substituted is considered as 100%, a degree of substitution of halogen is preferably 5% or greater, more preferably 10% or greater, and particularly preferably 15% or greater. The upper limit thereof is not particularly limited, as long as the degree of substitution is 100% or less. The number of oxygens or sulfurs interposed therein is preferably 1 to 20 and more preferably 1 to 15.

$X^2$, $X^3$, and $X^6$ may have the arbitrary substituents T described below, in the range of exhibiting the desired effects.

It is preferable that $X^2$, $X^3$, and $X^6$ are unsubstituted, but, in a case where $X^2$, $X^3$, and $X^6$ have substituents, in view of enhancing the water absorption, it is preferable that $X^2$, $X^3$, and $X^6$ do not have a polar group.

A total degree of substitution of the hydroxyl groups of the cellulose polymer is preferably 0.3 or greater, more preferably 1 or greater, even more preferably 1.5 or greater, and particularly preferably 2 or greater. The upper limit thereof is 3 or less.

Here, in the cellulose polymer, the total degree of substitution of the hydroxyl group is an average value of substitutions of hydroxyl groups per β-glucose ring unit. Accordingly, in a case where hydroxyl groups at 2 positions, 3 positions, and 6 positions of β-glucose rings or hydrogen atoms thereof are all substituted, a total degree of substitution of the hydroxyl groups becomes 3. Otherwise, in a case where the hydroxyl groups or hydrogen atoms are not substituted at all, a total degree of substitution of the hydroxyl groups becomes 0.

Unless particularly described otherwise, the total degree of substitution of the hydroxyl groups follows the conditions measured in the examples below.

Specific examples of the repeating unit for constituting the cellulose polymer are provided as below, but the invention is not interpreted to be limited thereto. The table below shows combinations of linking groups of Formula (1) and substituents.

TABLE A

| # | Linking group L | | | Substituent X | | | Total degree of substitution |
|---|---|---|---|---|---|---|---|
| | $L_A$ | $L_B$ | $L_C$ | $X_A$ | $X_B$ | $X_C$ | |
| 1 | Single bond | Single bond | — | H | Butyl | — | 0.3-2.8 |
| 2 | Single bond | Single bond | Single bond | H | Methyl | Butyl | 0.3-2.8 |
| 3 | Single bond | Single bond | Single bond | H | Methyl | Octyl | 0.3-2.8 |
| 4 | Single bond | Single bond | Single bond | H | Methyl | Perfluorooctyl | 0.3-2.8 |
| 5 | Single bond | Single bond | Single bond | H | Methyl | Stearyl | 0.3-2.8 |
| 6 | Single bond | Single bond | Single bond | H | Methyl | Phenyl | 0.3-2.8 |
| 7 | Single bond | Single bond | Single bond | H | Ethyl | Stearyl | 0.3-2.8 |
| 8 | Single bond | CO | — | H | Octyl | — | 0.3-2.8 |
| 9 | Single bond | CO | — | H | Butyl | — | 0.3-2.8 |
| 10 | Single bond | CO | CO | H | Methyl | Propyl | 0.3-2.8 |

TABLE A-continued

| # | Linking group L | | | Substituent X | | | Total degree of substitution |
|---|---|---|---|---|---|---|---|
|   | $L_A$ | $L_B$ | $L_C$ | $X_A$ | $X_B$ | $X_C$ |   |
| 11 | Single bond | Single bond | CO | H | Methyl | 2-Ethylheptyl | 0.3-2.8 |
| 12 | Single bond | Single bond | COO | H | Methyl | Butyl | 0.3-2.8 |
| 13 | Single bond | Single bond | COO | H | Methyl | Ethanolmethyl | 0.3-2.8 |
| 14 | Single bond | Single bond | COO | H | Methyl | Octyl | 0.3-2.8 |
| 15 | Single bond | COO | COO | H | Methyl | Propyl | 0.3-2.8 |
| 16 | Single bond | COO | COO | H | Methyl | Stearyl | 0.3-2.8 |
| 17 | Single bond | Single bond | CONH | H | Methyl | Butyl | 0.3-2.8 |
| 18 | Single bond | Single bond | CONH | H | Methyl | Octyl | 0.3-2.8 |
| 19 | Single bond | CONH | CONH | H | Methyl | 2-Ethylhexyl | 0.3-2.8 |
| 20 | Single bond | CONH | CONH | H | Methyl | Stearyl | 0.3-2.8 |
| 21 | Single bond | CO | COO | H | Propyl | Octyl | 0.3-2.8 |
| 22 | Single bond | CO | CONH | H | Butyl | Butyl | 0.3-2.8 |
| 23 | Single bond | COO | CONH | H | Octyl | Phenyl | 0.3-2.8 |

Here, subscripts A, B, and C indicated in the linking groups $L_A$, $L_B$, and $L_C$ are sequentially provided for convenience and represent that a hydroxyl group in the 3-position of β-glucose ring is randomly substituted, regardless of positions of hydroxyl groups in 2-, 3-, and 6-positions of a β-glucose ring. Meanwhile, the linking group $L_A$ represents that a substituent $X_A$ is substituted. This is the same in case of subscripts B and C. In a case where the hydroxyl group remains unsubstituted, -L-X is described to be a single bond and a hydrogen atom, and in this specification, the degree of substitution thereof is represented as $DS_A$.

The cellulose polymer can be supplied by common methods or synthesization.

The weight-average molecular weight of the cellulose polymer is preferably 10,000 or greater, more preferably 50,000 or greater, and particularly preferably 100,000 or greater. The upper limit thereof is preferably 2,000,000 or less and more preferably 1,000,000 or less. The weight-average molecular weight of the cellulose polymer is measured by the same method of measuring the weight-average molecular weight of the polymer indicated in the section of "Examples" below.

The formulation amount of the polymer is preferably 0.1 parts by mass or greater, more preferably 0.3 parts by mass or greater, and particularly preferably 1 parts by mass or greater with respect to 100 parts by mass of the inorganic solid electrolyte (including an active substance in a case where an active substance is used). The upper limit thereof is preferably 20 parts by mass or less, more preferably 10 parts by mass or less, and particularly preferably 5 parts by mass or less.

With respect to the solid electrolyte composition, in the solid content, the formulation amount of the cellulose polymer is preferably 0.1 mass % or greater, more preferably 0.3 mass % or greater, and particularly preferably 1 mass % or greater. The upper limit thereof is preferably 20 mass % or less, more preferably 10 mass % or less, and particularly preferably 5 mass % or less. If the cellulose polymer is caused to be in the range above, adherence of the inorganic solid electrolyte and the suppression properties of the interface resistance can be realized in a compatible manner.

One type of the cellulose polymers may be used singly or two or more types thereof may be used in combination. Otherwise, other polymers may be combined to be used.

With respect to the indication of the compound in the specification (for example, when a compound, a polymer, or the like is attached at the foot the indication), the indication is meant to include not only the compound but also a salt thereof and an ion thereof. The indication is meant to include a derivative in which a portion is changed such as a case where a substituent is introduced in the range in which a desired effect is achieved.

A substituent in which substitution or non-substitution is not indicated in this specification (in the same manner as in the linking group) means having an arbitrary substituent in the group. The meaning is the same as in the compound in which substitution or non-substitution is not indicated. Examples of the preferable substituent include the substituent T below.

Examples of the substituent T include the followings.

Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadiynyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having 6 to 26 carbon atoms, for example, phenyl, 1-naphthyl, 4-methoxyphenyl, 2-chlorophenyl, and 3-methylphenyl), a heterocyclic group (preferably a heterocyclic group having 2 to 20 carbon atoms, it is preferable that a heterocyclic group of 5 or 6-membered ring having at least one of an oxygen atom, a sulfur atom, or a nitrogen atom is preferable, for example, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atoms, for example, methoxy, ethoxy, isopropyloxy, and benzyloxy), an aryloxy group (preferably an aryloxy group having 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an amino group (preferably an amino group having 0 to 20 carbon atoms, examples thereof include an alkylamino group and an arylamino group, for example, amino, N,N-dimethylamino, N,N-diethylamino, N-ethylamino, and anilino), a sulfamoyl group (preferably a sulfamoyl group having 0 to 20 carbon atoms, for example, N,N-dimethylsulfamoyl and N-phenylsulfamoyl), an acyl group (preferably an acyl group having 1 to 20 carbon atoms, for example, acetyl, propionyl, butyryl, and benzoyl), an acyloxy group (preferably an acyloxy group having 1 to 20 carbon atoms, for example, acetyloxy, benzoyloxy), a carbamoyl group (preferably a carbamoyl group having 1 to 20 carbon atoms, for example, N,N-dimethylcarbamoyl and N-phenylcarbamoyl), an acylamino group (preferably an acylamino group having 1 to 20 carbon atoms, for example, acetylamino, and benzoylamino), a sulfonamide group (preferably a sulfamoyl group having 0 to 20 carbon atoms, for example, methanesulfonamide, benzenesulfonamide, N-methylmethanesulfonamide, and N-ethylbenzenesulfonamide), an alkylthio group (preferably an alkylthio group having 1 to 20 carbon atoms, for example, methylthio, ethylthio, isopropylthio, and benzylthio), arylthio group (preferably an arylthio group having 6 to 26 carbon atoms, for example, phenylthio, 1-naphthylthio, 3-methylphenylthio, and 4-methoxyphenylthio), an alkyl or arylsulfonyl group (preferably an alkyl or arylsulfonyl group having 1 to 20 carbon atoms, for example, methylsulfonyl, ethylsulfonyl, and benzenesulfonyl), a hydroxyl group, a cyano group, a halogen atom (for example, a fluorine atom, a chlorine atom, a bromine atom, and an iodine atom). An alkyl group, an alkenyl group, an aryl group, a heterocyclic group, an alkoxy group, an aryloxy group, an alkoxycarbonyl group, an amino group, an acylamino group, a phosphonic acid group, a sulfonic acid group, a phosphoric acid group, a carboxyl group, a hydroxyl group, or a halogen atom are more preferable.

Respective groups exemplified in the substituent T may be further substituted with the substituent T.

When a compound, a substituent•linking group, or the like includes an alkyl group•alkylene group, an alkenyl group•alkenylene group, an alkynyl group•alkynylene group, or the like, these may be a cyclic shape or a chain shape, may be linear or branched, or may be substituted as described above or unsubstituted. At this point, a group (for example, O, S, CO, or $NR^N$ ($R^N$ has the same meaning as above)) including a hetero atom is interposed in an alkyl group•alkylene group, an alkenyl group•alkenylene group, or an alkynyl group•alkynylene group, or a ring structure may be formed with an alkyl group•alkylene group, an alkenyl group•alkenylene group, or an alkynyl group•alkynylene group. When an aryl group, a heterocyclic group, or the like is included, an aryl group, a heterocyclic group, or the like may be a single ring or a fused ring or may be substituted in the same manner or may be unsubstituted.

(Electrolyte Salt [Support Electrolyte])

An electrolyte salt (a supporting electrolyte) may be contained in the solid electrolyte composition according to the invention. As the electrolyte salt, a lithium salt is preferable. As the lithium salt, a lithium salt that is generally used in a product of this type is preferable, and the type of the lithium salt is not particularly limited, but lithium salts described below are preferable.

(L-1) Inorganic lithium salt: An inorganic fluoride salt such as $LiPF_6$, $LiBF_4$, $LiAsF_6$, and $LiSbF_6$; a perhalogen acid salt such as $LiClO_4$, $LiBrO_4$, and $LiIO_4$; an inorganic chloride salt such as $LiAlCl_4$; and the like.

(L-2) Fluorine-containing organic lithium salt: a perfluoroalkane sulfonic acid salt such as $LiCF_3SO_3$; a perfluoroalkane sulfonylimide salt such as $LiN(CF_3SO_2)_2$, $LiN(CF_3CF_2SO_2)_2$, $LiN(FSO_2)_2$, and $LiN(CF_3SO_2)(C_4F_9SO_2)$; a perfluoroalkane sulfonylmethide salt such as $LiC(CF_3SO_2)_3$; a fluoroalkyl fluoride phosphoric acid salt such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and the like.

(L-3) Oxalatoborate salt: lithium bis(oxalato)borate, lithium difluorooxalatoborate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferable, and a lithiumimide salt such as $LiPF_6$, $LiBF_4$, $LiN(Rf^1SO_2)_2$, $LiN(FSO_2)_2$, and $LiN(Rf^1SO_2)(Rf^2SO_2)$ is still more preferable. Here, $Rf^1$ and $Rf^2$ each represent a perfluoroalkyl group.

The content of the lithium salt is preferably 0.1 parts by mass or greater and more preferably 0.5 parts by mass or greater with respect to 100 parts by mass of the solid electrolyte. The upper limit is preferably 10 parts by mass or less and more preferably 5 parts by mass or less.

The electrolyte may be used singly or two or more types thereof may be arbitrarily used in combination.

(Dispersion Medium)

In the solid electrolyte composition according to the invention, the dispersion medium in which the respective components are dispersed may be used. When the all-solid-state secondary battery is produced, it is preferable that the solid electrolyte composition is caused to be a paste form by adding a dispersion medium to the solid electrolyte composition, in order to evenly apply the solid electrolyte composition so as to form a film. When the solid electrolyte layer of the all-solid-state secondary battery is formed, the dispersion medium is removed by drying.

Examples of the dispersion medium include a water soluble or water insoluble organic solvent. Specific examples thereof include the followings.

Alcohol Compound Solvent

Methyl alcohol, ethyl alcohol, 1-propyl alcohol, 2-propyl alcohol, 2-butanol, ethylene glycol, propylene glycol, glycerine, 1,6-hexanediol, cyclohexanediol, sorbitol, xylitol, 2-methyl-2,4-pentanediol, 1,3-butanediol, 1,4-butanediol, and the like Ether Compound Solvent (Including Hydroxy Group-containing Ether Compound)

Dimethyl ether, diethyl ether, diisopropyl ether, dibutyl ether, t-butylmethyl ether, cyclohexylmethyl ether, anisole, tetrahydrofuran, alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, or the like)

Amide Compound Solvent

N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methyl formamide, acetoamide, N-methylacetoamide, N,N-dimethylacetoamide, N-methylpropanamide, hexamethylphosphoric triamide, and the like Ketone Compound Solvent Acetone, methyl ethyl ketone, methyl isobutyl ketone, cyclohexanone, or the like Aromatic Compound Solvent Benzene, toluene, or the like Aliphatic Compound Solvent Hexane, heptane, cyclohexane, methylcyclohexane, octane, pentane, cyclopentane, or the like Nitrile Compound Solvent Acetonitrile According to the invention, among these, it is preferable to use an ether compound solvent, a ketone compound solvent, an aromatic compound solvent, and an aliphatic compound solvent. With respect to the dispersion medium, the boiling point in the normal pressure (1 atmospheric pressure) is preferably 50° C. or greater and more preferably 80° C. or greater. The upper limit thereof is preferably 220° C. or less and more preferably 180° C. or less. The dispersion medium may be used singly or two or more types thereof may be used in combination.

According to the invention, the amount of the dispersion medium in the solid electrolyte composition can be caused to be an arbitrary amount in the balance between viscosity and a dry load of the solid electrolyte composition. Generally, the amount of the dispersion medium is preferably 20 to 99 mass % in the solid electrolyte composition.

(Positive Electrode Active Substance)

The positive electrode active substance may be contained in the solid electrolyte composition, such that a positive electrode active substance layer is formed. In this manner, a composition for a positive electrode material can be made. Transition metal oxide is preferably used in the positive electrode active substance. Among them, transition metal oxide having a transition element $M^a$ (1 type or more elements selected from Co, Ni, Fe, Mn, Cu, and V) is preferable. A mixed element $M^b$ (an element in Group 1 (Ia) of the periodic table of metal other than lithium, an element in Group 2 (IIa), Al, Ga, In, Ge, Sn, Pb, Sb, Bi, Si, P, B, and the like) may be mixed. Examples of this transition metal oxide include a specific transition metal oxide including oxide expressed by any one of Formulae (MA) to (MC) below or include $V_2O_5$ and $MnO_2$, as additional transition metal oxide. A particle-state positive electrode active substance may be used in the positive electrode active substance. Specifically, it is possible to use a transition metal oxide to which a lithium ion can be reversibly inserted or released, but it is preferable to use the specific transition metal oxide described above.

Examples of the transition metal oxide suitably include oxide including the transition element $M^a$. At this point, the mixed element $M^b$ (preferably Al) and the like are mixed. The mixture amount is preferably 0 to 30 mol % with respect to the amount of the transition metal. It is more preferable that the transition element obtained by synthesizing elements such that the molar ratio of Li/$M^a$ becomes 0.3 to 2.2.

[Transition Metal Oxide Expressed by Formula (MA) (Layered rock salt structure)]

As the lithium-containing transition metal oxide, metal oxide expressed by the following formula is preferable.

$$Li_aM^1O_b \quad (MA)$$

In the formula, $M^1$ has the same as Ma above. a represents 0 to 1.2 (preferably 0.2 to 1.2) and preferably represents 0.6 to 1.1. b represents 1 to 3, and preferably 2. A portion of $M^1$ may be substituted with the mixed element $M^b$. The transition metal oxide expressed by Formula (MA) above typically has a layered rock salt structure.

The transition metal oxide according to the invention is more preferably expressed by the following formulae;

$$Li_gCoO_k, \quad (MA\text{-}1)$$

$$Li_gNiO_k, \quad (MA\text{-}2)$$

$$Li_gMnO_k, \quad (MA\text{-}3)$$

$$Li_gCo_jNi_{1-j}O_k, \quad (MA\text{-}4)$$

$$Li_gNi_jMn_{1-j}O_k, \quad (MA\text{-}5)$$

$$Li_gCo_jNi_iAl_{1-j-i}O_k, \text{ and} \quad (MA\text{-}6)$$

$$Li_gCo_jNi_iMn_{1-j-i}O_k. \quad (MA\text{-}7)$$

Here, g has the same meaning as a above. j represents 0.1 to 0.9. i represents 0 to 1. However, 1−j−i becomes 0 or greater. k has the same meaning as b above. Specific examples of the transition metal compound include $LiCoO_2$ (lithium cobalt oxide [LCO]), $LiNi_2O_2$ (lithium nickel oxide), $LiNi_{0.85}Co_{0.01}Al_{0.05}O_2$ (lithium nickel cobalt aluminum oxide [NCA]), $LiNi_{0.33}Co_{0.33}Mn_{0.33}O_2$ (lithium nickel cobalt manganese oxide [NMC]), and $LiNi_{0.5}Mn_{0.5}O_2$ (lithium manganese oxide).

Though partially overlapped, if the transition metal oxide expressed by Formula (MA) is indicated by changing the indication, the following are also provided as preferable examples.

(i) $Li_gNi_xMn_yCo_zO_2$ (x>0.2, y>0.2, z≥0, x+y+z=1)
Representative Transition Metal Oxide:
$Li_gNi_{1/3}Mn_{1/3}Co_{1/3}O_2$
$Li_gNi_{1/2}Mn_{1/2}O_2$ (ii) $Li_gNi_xCo_yAl_zO_2$ (x>0.7, y>0.1, 0.1>z≥0.05, x+y+z=1)
Representative Transition Metal Oxide:
$Li_gNi_{0.8}Co_{0.15}Al_{0.05}O_2$

[Transition Metal Oxide Expressed by Formula (MB) (Spinel-Type Structure)]

Among them, as the lithium-containing transition metal oxide, transition metal oxide expressed by Formula (MB) below is also preferable.

$$Li_cM^2{}_2O_d \quad (MB)$$

In the formula, $M^2$ has the same meaning as Ma above. c represents 0 to 2 (preferably 0.2 to 2) and preferably represents 0.6 to 1.5. d represents 3 to 5, and preferably represents 4.

The transition metal oxide expressed by Formula (MB) is more preferably transition metal oxide expressed by the following formulae:

$$Li_mMn_2O_n, \quad (MB\text{-}1)$$

$$Li_mMn_pAl_{2-p}O_n, \text{ and} \quad (MB\text{-}2)$$

$$Li_mMn_pNi_{2-p}O_n. \quad (MB\text{-}3)$$

m has the same meaning as c. n has the same meaning as d. p represents 0 to 2. Specific examples of the transition metal compound include $LiMn_2O_4$ and $LiMn_{1.5}Ni_{0.5}O_4$.

Transition metal oxide expressed by the following formulae is also provided as preferable examples of the transition metal oxide expressed by Formula (MB):

(a) $LiCoMnO_4$,
(b) $Li_2FeMn_3O_8$,
(c) $Li_2CuMn_3O_8$,
(d) $Li_2CrMn_3O_8$, and
(e) $Li_2NiMn_3O_8$.

Among the above, in view of high capacity and high output, an electrode including Ni is more preferable.

[Transition Metal Oxide Expressed by Formula (MC)]

As the lithium-containing transition metal oxide, lithium-containing transition metal phosphorus oxide is preferably used. Among them, transition metal oxide expressed by Formula (MC) below is also preferable.

$$Li_eM^3(PO_4)_f \quad (MC)$$

In the formula, e represents 0 to 2 (preferably 0.2 to 2) and preferably 0.5 to 1.5. f represents 1 to 5 and preferably represents 0.5 to 2.

$M^3$ above represents one or more types of elements selected from V, Ti, Cr, Mn, Fe, Co, Ni, and Cu. $M^3$ above may be substituted with other metal such as Ti, Cr, Zn, Zr, and Nb, in addition to the mixed element $M^b$ above. Specific examples thereof include an olivine-type iron phosphate salt such as $LiFePO_4$ and $Li_3Fe_2(PO_4)_3$, iron pyrophosphates such as $LiFeP_2O_7$, cobalt phosphates such as $LiCoPO_4$, and a monoclinic nasicon-type vanadium phosphate salt such as $Li_3V_2(PO_4)_3$ (vanadium lithium phosphate).

The values of a, c, g, m, and e representing the composition of Li are values that are changed depending on charging and discharging, and are typically evaluated by the values in a stable state when Li is contained. In Formulae (a)

to (e) above, the composition of Li is indicated with specific values, but this is changed depending on an operation of the battery in the same manner.

The average particle size of the positive electrode active substance is not particularly limited, but the average particle size is preferably 0.1 μm to 50 μm. In order to cause the positive electrode active substance to have a predetermined particle size, a general pulverizer and a general classifier may be used. The positive electrode active substance obtained by the baking method may be used after being washed with water, an acidic aqueous solution, an alkaline aqueous solution, or an organic dissolving agent.

The concentration of the positive electrode active substance is not particularly limited, but the concentration in the solid electrolyte composition is preferably 20 to 90 mass % and more preferably 40 to 80 mass % with respect to 100 mass % of the solid component.

The positive electrode active substance may be used singly or two or more types thereof may be used in combination.

(Negative Electrode Active Substance)

The solid electrolyte composition according to the invention may be caused to contain the negative electrode active substance so as to form the negative electrode active substance layer. In this manner, a composition for the negative electrode material can be made. As the negative electrode active substance, an active substance to which a lithium ion can be reversibly inserted or released is preferable. The material is not particularly limited, and examples thereof include carbonaceous material, metal oxide or metal composite oxide such as tin oxide and silicon oxide, a single substance of lithium, a lithium alloy such as a lithium aluminum alloy, and metal that can form an alloy with lithium such as Sn or Si. Among these, the carbonaceous material or lithium composite oxide is preferably used in view of credibility. As the metal composite oxide, metal composite oxide that can occlude or release lithium is preferable. The material thereof is not particularly limited, but a material that contains titanium and/or lithium as the constituent component is preferable in view of characteristics at high current density.

The carbonaceous material used as the negative electrode active substance is a material that is substantially made of carbon. Examples thereof include petroleum pitch, natural graphite, artificial graphite such as vapor phase-grown graphite, and a carbonaceous material obtained by baking various synthetic resins such as a PAN-based resin or a furfuryl alcohol resin. Examples thereof further include various carbon fibers such as a PAN-based carbon fiber, a cellulose-based carbon fiber, a pitch-based carbon fiber, a vapor phase-grown carbon fiber, a dehydrated PVA-based carbon fiber, a lignin carbon fiber, a glass-state carbon fiber, and an active carbon fiber, a mesophase microsphere, a graphite whisker, and a flat plate-shaped graphite.

These carbonaceous materials may be divided into a hardly graphitizable carbon material and a graphite-based carbon material according to the degree of graphitization. The carbonaceous material preferably has surface intervals, density, and sizes of crystallite as disclosed in JP1987-22066A (JP-S62-22066A), JP1990-6856A (JP-H2-6856A), and JP1991-45473A (JP-H3-45473A). The carbonaceous material does not have to be a single material, and a mixture of natural graphite and artificial graphite disclosed in JP1993-90844A (JP-H5-90844A), graphite having a coating layer disclosed in JP1994-4516A (JP-H6-4516A), and the like can be used.

As the metal oxide and metal composite oxide that are applied as the negative electrode active substance, amorphous oxide is particularly preferable, and, further, chalcogenide which is a reaction product of a metal element and an element in Group 16 in the periodic table can be preferably used. The expression "amorphous" herein means to have a broad scattering band having a vertex in an area of 20° to 40° in 2θ values in the X-ray diffraction method using CuKα rays, and may have crystalline diffraction lines. The strongest strength of the crystalline diffraction lines seen at 40° to 70° in the 2θ values is preferably 100 times or less and more preferably 5 times or less in the diffraction line intensity in the vertex of a broad scattering band seen at 20° to 40° in the 2θ value, and it is particularly preferable that oxide does not have a crystalline diffraction line.

Among the compound groups made of amorphous oxide and chalcogenide, amorphous oxide and chalcogenide of a metalloid element are more preferable, and an element of Groups 13 (IIIB) to 15 (VB) in the periodic table, a single substance of Al, Ga, Si, Sn, Ge, Pb, Sb, or Bi or oxide made of a combination obtained by combining two or more types thereof, and chalcogenide are particularly preferable. Specific examples of preferable amorphous oxide and chalcogenide preferably include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. These may be composite oxide with lithium oxide, for example, $Li_2SnO_2$.

The average particle size of the negative electrode active substance is preferably 0.1 μm to 60 μm. In order to cause the negative electrode active substance to have a predetermined particle size, a well-known pulverizer and a well-known classifier are used. For example, a mortar, a ball mill, a sand mill, a vibrating ball mill, a satellite ball mill, a planetary ball mill, a swirling air stream-type jet mill, and a sieve are suitably used. At the time of pulverizing, wet pulverization in which an organic solvent such as water or methanol coexist may be performed, if necessary. In order to obtain a desired particle diameter, classification is preferably performed. A pulverization method is not particularly limited, and a sieve, an air classifier, or the like can be used, if necessary. As the classification, both dry-type classification and wet-type classification can be used.

The chemical formula of the compound obtained by the baking method can be calculated in an inductive coupling plasma (ICP) emission spectrophotometric analysis method as a measuring method or can be calculated from a mass difference between particles before and after baking, as a simple method.

Examples of the negative electrode active substance that can be used together with an amorphous oxide negative electrode active substance mainly using Sn, Si, and Ge suitably include a carbon material that can occlude and release lithium ion, lithium metal or lithium, lithium alloy, or metal that can be formed to an alloy with lithium.

The negative electrode active substance preferably contains a titanium atom. More specifically, since the volume of $Li_4Ti_5O_{12}$ is small when a lithium ion is occluded and released, quick charging-discharging properties are excellent, the deterioration of the electrode is prevented, and the lifespan of the lithium ion secondary battery can be improved. Therefore, $Li_4Ti_5O_{12}$ is preferable.

In the all-solid-state secondary battery according to the invention, it is preferable to apply a negative electrode active substance containing an Si element. Generally, the Si negative electrode occludes more Li ions than currently used carbon negative electrodes (graphite, acetylene black, and the like). That is, since an Li ion occlusion amount per weight increases, battery capacity increases. As a result, there is an advantage of increasing battery driving time, and thus the use thereof in batteries for vehicles or the like in the future is expected. Meanwhile, it is known that a volume change according to occlusion or discharge of Li ions is great, and there are examples in which volume expansion in a carbon negative electrode is about 1.2 to 1.5 times, and that in an Si negative electrode is about 3 times. If expansion and contraction thereof are repeated (charge and discharge are repeated), durability of the electrode layer becomes deficient, for example, shortage of contact easily occurs or cycle life (battery life) is shortened.

According to the solid electrolyte composition of the invention, in the electrode layer in which expansion•contraction thereof increases, high durability (strength) is exhibited, such that excellent advantages thereof can be exhibited more effectively.

The concentration of the negative electrode active substance is not particularly limited, but the concentration in the solid electrolyte composition is preferably 10 to 80 mass % and more preferably 20 to 70 mass % with respect to 100 mass % of the solid component.

The embodiment above has been described, considering an example in which a positive electrode active substance and a negative electrode active substance is contained in the specific solid electrolyte composition, but the invention is not limited to thereto. For example, a paste including a positive electrode active substance and a negative electrode active substance as the composition that does not include the cellulose polymer may be prepared. At this point, it is preferable to contain the inorganic solid electrolyte layer. In this manner, the positive electrode material and the negative electrode material which are commonly used are combined, and the solid electrolyte composition relating to the preferable embodiment of the invention may be used to form an inorganic solid electrolyte layer. The conductive assistance may be suitably contained in the active substance layer of the positive electrode and the negative electrode, if necessary. General examples of the electron conductive material include a carbon fiber, such as graphite, carbon black, acetylene black, Ketjen black, and a carbon nanotube, metal powders, a metal fiber, and a polyphenylene derivative.

The negative electrode active substance may be used singly or two or more types thereof may be used in combination.

<Collector (Metallic Foil)>

It is preferable that an electron conductor that does not cause a chemical change is used as the collector of the positive•negative electrodes. As the collector of the positive electrode, in addition to aluminum, stainless steel, nickel, titanium, and the like, a product obtained by treating carbon, nickel, titanium, or silver on the surface of aluminum and stainless steel is preferable. Among them, aluminum and an aluminum alloy are more preferable. As the negative electrode collector, aluminum, copper, stainless steel, nickel, and titanium are preferable, and aluminum, copper, and a copper alloy are more preferable.

As the form of the collector, a sheet-shaped collector is commonly used, but a net, a punched collector, a lath body, a porous body, a foam body, a molded body of a fiber group, and the like can be used. The thickness of the collector is not particularly limited, but the thickness is preferably 1 μm to 500 μm. Unevenness is preferably formed on the collector surface by a surface treatment.

<Producing of all-Solid-State Secondary Battery>

Producing of the all-solid-state secondary battery may be performed by the common method. Specific examples thereof include a method of coating the metal foil that becomes a collector with the solid electrolyte composition, so as to obtain an electrode sheet for batteries in which a coated film is formed. For example, after the metal foil that becomes a positive electrode collector is coated with the composition that becomes the positive electrode material and dried, so as to form a positive electrode layer. Subsequently, after the positive electrode sheet for batteries is coated with the solid electrolyte composition, a solid electrolyte layer is formed. Thereof, after the composition that becomes the negative electrode material is coated and dried, a negative electrode layer is formed. If a collector (metal foil) on the negative electrode side is overlapped thereon, a structure of an all-solid-state secondary battery in which a solid electrolyte layer is interposed between the positive electrode layer and the negative electrode layer can be obtained. Coating methods of the respective compositions may be performed in common methods. At this point, a drying treatment may be performed after a composition for forming a positive electrode active substance layer, a composition (solid electrolyte composition) for forming an inorganic solid electrolyte layer, and a composition for forming a negative electrode active substance layer are applied respectively, or a drying treatment may be performed after multilayer coating. A drying temperature is not particularly limited, but is preferably 30° C. or greater and more preferably 60° C. or greater. The upper limit thereof is preferably 300° C. or less and more preferably 250° C. or less. If heating is performed in this temperature range, it is possible to remove a dispersion medium and cause the compositions in a solid state. Accordingly, with respect to the all-solid-state secondary battery, suitable binding properties and ion conductivity under non-pressurization can be obtained.

<Use of all-Solid-State Secondary Battery>

The all-solid-state secondary battery according to the invention can be applied to various uses. The use embodiment is not particularly limited, but, if the all-solid-state secondary battery is mounted in an electronic device, examples thereof include a notebook personal computer, a pen input personal computer, a mobile computer, an electron book player, a cellular phone, a cordless phone slave unit, a pager, a handy terminal, a portable fax machine, a portable copying machine, a portable printer, a headphone stereo, a video movie, a liquid crystal television, a handy cleaner, a portable CD, a mini disc, an electric shaver, a transceiver, an electronic organizer, a calculator, a memory card, a portable tape recorder, radio, a backup power supply, and a memory card. Examples of additional consumer use include an automobile, an electric motor vehicle, a motor, lighting equipment, a toy, a game machine, a load conditioner, a clock, a stroboscope, a camera, and medical equipment (a pacemaker, a hearing aid, and a shoulder massager). The all-solid-state secondary battery can be used for military or space. The all-solid-state secondary battery can be combined with a solar battery.

Among these, the all-solid-state secondary battery is preferably applied to an application that requires discharging properties at high capacity and a high rate. For example, in an electric storage facility and the like in which high capacity enhancement is expected in the future, high credibility is necessary, and thus compatibility between battery properties is required. A high capacity secondary battery is mounted on an electric car and the like, a use in which charging is performed everyday at home is assumed, and credibility at overcharging is further required. According to the invention, an excellent effect can be achieved suitably in response to these use embodiments.

According to the preferable embodiment of the invention, respective applications as follows are provided.

A solid electrolyte composition (a composition for electrodes of a positive electrode or a negative electrode) that includes an active substance that can insert or release ion of metal belonging to Group 1 or 2 of the periodic table.

An electrode sheet for batteries obtained by forming a film of a solid electrolyte composition on a metallic foil.

An all-solid-state secondary battery including a positive electrode active substance layer, a negative electrode active substance layer, and an inorganic solid electrolyte layer, in which at least one of the positive electrode active substance layer, the negative electrode active substance layer, or the inorganic solid electrolyte layer is a layer formed of a solid electrolyte composition.

A manufacturing method of an electrode sheet for batteries by disposing the solid electrolyte composition on a collector, and performing heating at a predetermined temperature.

An all-solid-state secondary battery manufacturing method of an all-solid-state secondary battery in the manufacturing method of an electrode sheet for batteries.

The all-solid-state secondary battery refers to a secondary battery that is formed of a positive electrode, a negative electrode, and an electrolyte which are all solid. In other words, the all-solid-state secondary battery is different from an electrolyte solution-type secondary battery in which a carbonate-based solvent is used as an electrolyte. Among these, the invention relates to an inorganic all-solid-state secondary battery. The all-solid-state secondary battery is classified into the organic (polymer) all-solid-state secondary battery using a polymer compound such as polyethylene oxide as an electrolyte and the inorganic all-solid-state secondary battery using LLT, LLZ, or the like. A polymer compound can be applied as binders of the positive electrode active substance, the negative electrode active substance, and the inorganic solid electrolyte particle, without preventing application to an inorganic all-solid-state secondary battery.

The inorganic solid electrolyte is different from the electrolyte (polymer electrolyte) using a polymer compound as an ion conducting medium and the inorganic compound becomes an ion conducting medium. Specific examples thereof include LLT or LLZ above.

The inorganic solid electrolyte itself does not release a positive ion (Li ion), but exhibits an ion transporting function. In contrast, an electrolyte solution or a material that becomes a supply source of an ion that is added to a solid electrolyte layer and releases a positive ion (Li ion) is called an electrolyte, but when the electrolyte is differentiated from the electrolyte as the ion transferring material, the electrolyte is called an "electrolyte salt" or a "supporting electrolyte". Examples of the electrolyte salt include lithium bistrifluoromethane sulfone imide (LiTFSI).

In this specification, the expression "composition" means a mixture in which two or more components are evenly mixed. However, evenness may be substantially maintained, and aggregation or uneven distribution may partially occur in a range in which a desired effect is exhibited.

EXAMPLES

Hereinafter, the invention is described in detail with reference to the examples, but the invention is not interpreted to be limited thereto. When "parts" or "%" is indicated for formulation amounts and concentrations, "parts" or "%" is indicated in terms of mass, unless described otherwise.

Synthesization Example of Cellulose Polymer (B)

Synthesization Example 1

Synthesization of Butyl Cellulose (P-1)

80.0 g of cellulose (manufactured by Nippon Paper Industries Co., Ltd.: KC FLOCK W400) and 1,800 mL of dimethylacetoamide were added to a 5,000 mL three-neck flask provided with a reflux condenser, a mechanical stirrer, a thermometer, and a dropping funnel, stirring was performed at 120° C. for two hours, 150.0 g of lithium chloride was added, and stirring was continued for one hour. After a reaction solution was returned to room temperature, 100 g of powdered sodium hydroxide was added, and stirring was performed at 60° C. for one hour. While the reaction solution was cooled in a water bath, 80 mL of butyl iodide was dropwisely added, and further stirring was performed at 50° C. for three hours. After the reaction, the solution was returned to room temperature, the reaction solution was added to 12 L of methanol while intensely stirring, so as to precipitate a white solid. After a white solid was separated by suction filtration, washing was performed three times with a large amount of isopropanol. The obtained white solid was dried in a reduced pressure at 100° C. for six hours, so as to obtain 92.0 g of desired P-1. A weight-average molecular weight thereof was 150,000.

Synthesization Example 2

Synthesization of Methylbutyl Cellulose (P-2)

80.0 g of methyl cellulose (manufactured by Wako Pure Chemical Industries, Ltd.: degree of substitution of methyl: 1.8) and 2,000 mL of dimethylacetoamide were added to a 5,000 mL three-neck flask provided with a reflux condenser, a mechanical stirrer, a thermometer, and a dropping funnel, stirring was performed at room temperature, 100 g of powdered sodium hydroxide was added, and stirring was performed at 60° C. for one hour. While the reaction solution was cooled in a water bath, 80 mL of butyl iodide was dropwisely added, and further stirring was performed at 50° C. for three hours. After the reaction, the solution was returned to room temperature, the reaction solution was added to 12 L of methanol while intensely stirring, so as to precipitate a white solid. After a white solid was separated by suction filtration, washing was performed three times with a large amount of isopropanol. The obtained white solid was dried in a reduced pressure at 100° C. for six hours, so as to obtain 84.0 g of desired P-2. A weight-average molecular weight thereof was 399,000.

Synthesization Example 3

Synthesization of Methyloctyl Cellulose (P-3)

86.0 g of desired P-3 was obtained in the same manner as Synthesization Example 2, except for changing butyl iodide to octyl iodide. A weight-average molecular weight thereof was 425,000.

Synthesization Example 4

Synthesization of Methylstearyl Cellulose (P-4)

90.0 g of desired P-4 was obtained in the same manner as Synthesization Example 2, except for changing butyl iodide to stearyl iodide. A weight-average molecular weight thereof was 463,000.

Synthesization Example 5

Synthesization of Methylphenyl Cellulose (P-5)

84.0 g of desired P-5 was obtained in the same manner as Synthesization Example 2, except for changing butyl iodide to iodobenzene. A weight-average molecular weight thereof was 444,000.

Synthesization Example 6

Synthesization of Cellulose Butyrate (P-6)

80.0 g of cellulose (manufactured by Nippon Paper Industries Co., Ltd.: KC FLOCK W400) and 1,800 mL of dimethylacetoamide were added to a 5,000 mL three-neck flask provided with a reflux condenser, a mechanical stirrer, a thermometer, and a dropping funnel, stirring was performed at 120° C. for two hours, 150.0 g of lithium chloride was added, and stirring was continued for one hour. After a reaction solution was returned to room temperature, 370 mL of pyridine was added, 320 mL of n-octanoyl chloride was dropwisely added while the reaction solution was cooled in a water bath, and further stirring was performed at room temperature for five hours. After the reaction, the solution was returned to room temperature, the reaction solution was added to 10 L of methanol while intensely stirring, so as to precipitate a white solid. After a white solid was separated by suction filtration, washing was performed three times with a large amount of isopropanol. The obtained white solid was dried in a reduced pressure at 100° C. for six hours, so as to obtain 120.0 g of desired P-6. A weight-average molecular weight thereof was 182,000.

Synthesization Example 7

Synthesization of Methyl Cellulose Butanoate (P-7)

80.0 g of methyl cellulose (manufactured by Wako Pure Chemical Industries, Ltd.: degree of substitution of methyl: 1.8), 1,000 mL of methylene chloride, and 1,000 mL of pyridine were added to a 5,000 mL three-neck flask provided with a reflux condenser, a mechanical stirrer, a thermometer, and a dropping funnel, stirring was performed at room temperature, 1,000 mL of acetic anhydride was dropwisely added, 0.2 g of dimethyl aminopyridine (DMAP) was added, and heat refluxing was performed for three hours. After the reaction, the solution was returned to room temperature, 200 mL of methanol was added in an ice bath, and quenching was performed. The reaction solution was added to methanol/water (10 L/10 L) while intensely stirring, so as to precipitate a white solid. After a white solid was separated by suction filtration, washing was performed three times with a large amount of water. The obtained white solid was dried in a reduced pressure at 100° C. for six hours, so as to obtain 78.0 g of desired P-7. A weight-average molecular weight thereof was 582,000.

Synthesization Example 8

Synthesization of Methyl Cellulose Octanoate (P-8)

80.0 g of methyl cellulose (manufactured by Wako Pure Chemical Industries, Ltd.: methyl degree of substitution: 1.8), and 1,500 mL of pyridine were added to a 5,000 mL three-neck flask provided with a reflux condenser, a mechanical stirrer, a thermometer, and a dropping funnel, stirring was performed at room temperature, 160 mL of n-octanoyl chloride was dropwisely added under ice cooling, and stirring was performed at 60° C. for six hours. After the reaction, the solution was returned to room temperature, 200 mL of methanol was added in an ice bath, and quenching was performed. The reaction solution was added to 12 L of water while intensely stirring, so as to precipitate a white solid. After a white solid was separated by suction filtration, washing was performed three times with a large amount of methanol. The obtained white solid was dried in a reduced pressure at 100° C. for six hours, so as to obtain 93.0 g of desired P-8. A weight-average molecular weight thereof was 603,000.

Synthesization Example 9

Synthesization of Methyl Cellulose-2-Ethylhexanoate (P-9)

91.0 g of desired P-9 was obtained in the same manner as Synthesization Example 8, except for changing n-octanoyl chloride to 2-ethylhexanoyl chloride. A weight-average molecular weight thereof was 651,000).

Synthesization Example 10

Synthesization of Methyl Cellulose Benzoate (P-10)

82.0 g of desired P-10 was obtained in the same manner as Synthesization Example 8, except for changing n-octanoyl chloride to chloride benzoate. A weight-average molecular weight thereof was 522.000.

Synthesization Example 11

Synthesization of Cellulose Ethyl Carbonate (P-11)

110.0 g of desired P-11 was obtained in the same manner as Synthesization Example 6, except for changing n-octanoyl chloride to ethyl chloroformate. A weight-average molecular weight thereof was 168,000.

Synthesization Example 12

Synthesization of Methyl Cellulose-2-Ethylhexyl Carbonate (P-12)

92.0 g of desired P-12 was obtained in the same manner as Synthesization Example 8, except for changing n-octanoyl chloride to 2-ethylhexyl chloroformate. A weight-average molecular weight thereof was 233,000.

Synthesization Example 13

Synthesization of Methyl Cellulose Propyl Carbamate (P-13)

72.0 g of desired P-13 was obtained in the same manner as Synthesization Example 8, except for changing 160 mL of n-octanoyl chloride to 108.8 g of propyl isocyanate. A weight-average molecular weight thereof was 144,000.

Synthesization Examples 14 and 15

Synthesization of Methyl/Ethyl Cellulose (P-14 and P-15)

Desired P-14 and P-15 were obtained in the same manner as Synthesization Example 1, except for changing butyl iodide to methyl iodide or ethyl iodide. Weight-average molecular weights thereof were shown in the table.

SEROGEN 3H (Carboxyethyl cellulose) which is a product name manufactured by Dai-ichi Kogyo Seiyaku Co., Ltd. was used as P-16, and hydroxy propyl cellulose manufactured by Wako Pure Chemical Industries, Ltd. was used as P-17.

<With Respect to Degree of Substitution>

In three hydroxyl groups on a β-glucose ring in cellulose, a degree of substitution of the substituent B is set to $DS_B$, and a degree of substitution of the substituent C is set to $DS_C$. With respect to an unsubstituted hydroxyl group, since a degree of substitution of the substituent A in which hydrogen atoms are not substituted is represented as $DS_A$, the sum of the respect degrees of substitution ($DS_A+DS_B+DS_C$) is 3. The total degree of substitution of the hydroxyl group of the cellulose polymer is $DS_B+DS_C$. In addition, the substituent A, the substituent B, and the substituent C do not correspond to $L^2X^2$, $L^3X^3$, and $L^6X^6$ of Formula (1). According to various meanings described above, the three substituents are differenciated. In other words, the substituent A, the substituent B, and the substituent C are any one of $L^2X^2$, $L^3X^3$, and $L^6X^6$ of Formula (1), and may be any one of those. The substituent A, the substituent B, and the substituent C respectively represent substituents consisting of combinations of the divalent linking groups $L_A$, $L_B$, and $L_C$ and substituents $X_A$, $X_B$, and $X_C$.

In Table 1 below, for example, P-1 is specifically described in the sections of the substituent A and the substituent B, the expression "—" is described in the section of the substituent C. This represents that a portion of a hydroxyl group on a β-glucose ring is substituted with a butyl group, and "a total degree of substitution of a hydroxyl group" is 2.2.

Types of the substituents and degrees of substitutions were observed and determined by using methods disclosed in Cellulose Communication 6, 73-79 (1999) and Chrality 12 (9), 670-674, by 1H-NMR or 13C-NMR.

TABLE 1

| Name | Weight-average molecular weight | Substituent A | | | Substituent B | | | Substituent C | | |
|---|---|---|---|---|---|---|---|---|---|---|
| | | $L_A$ | $X_A$ | $DS_A$ | $L_B$ | $X_B$ | $DS_B$ | $L_C$ | $X_C$ | $DS_C$ |
| P-1 | 150,000 | Single bond | Hydrogen atom | 0.8 | Single bond | Butyl group | 2.2 | — | — | — |
| P-2 | 399,000 | Single bond | Hydrogen atom | 0.3 | Single bond | Methyl group | 1.8 | Single bond | Butyl group | 0.9 |
| P-3 | 425,000 | Single bond | Hydrogen atom | 0.4 | Single bond | Methyl group | 1.8 | Single bond | Octyl group | 0.8 |
| P-4 | 463,000 | Single bond | Hydrogen atom | 0.4 | Single bond | Methyl group | 1.8 | Single bond | Stearyl group | 0.8 |
| P-5 | 444,000 | Single bond | Hydrogen atom | 0.5 | Single bond | Methyl group | 1.8 | Single bond | Phenyl group | 0.7 |
| P-6 | 182,000 | Single bond | Hydrogen atom | 0.9 | CO | Heptyl group | 2.1 | — | — | — |
| P-7 | 582,000 | Single bond | Hydrogen atom | 0.3 | Single bond | Methyl group | 1.8 | CO | Propyl group | 0.9 |
| P-8 | 603,000 | Single bond | Hydrogen atom | 0.3 | Single bond | Methyl group | 1.8 | CO | Heptyl group | 0.9 |
| P-9 | 651,000 | Single bond | Hydrogen atom | 0.4 | Single bond | Methyl group | 1.8 | CO | 2-Ethylpentyl group | 0.8 |
| P-10 | 522,000 | Single bond | Hydrogen atom | 0.5 | Single bond | Methyl group | 1.8 | CO | Phenyl group | 0.7 |
| P-11 | 168,000 | Single bond | Hydrogen atom | 0.4 | COO | Ethyl group | 2.6 | — | — | — |
| P-12 | 233,000 | Single bond | Hydrogen atom | 0.3 | Single bond | Methyl group | 1.8 | COO | 2-Ethylhexyl group | 0.9 |
| P-13 | 144,000 | Single bond | Hydrogen atom | 0.3 | Single bond | Methyl group | 1.8 | CONH | Propyl group | 0.9 |
| P-14 | 160,000 | Single bond | Hydrogen atom | 0.8 | Single bond | Methyl group | 2.2 | — | — | — |
| P-15 | 170,000 | Single bond | Hydrogen atom | 0.8 | Single bond | Ethyl group | 2.2 | — | — | — |
| P-16 | 210,000 | Single bond | Hydrogen atom | 2.4 | Single bond | —$CH_2COO^-Na^+$ | 0.6 | — | — | — |
| P-17 | 100,000 | — | — | — | Single bond | 2-Hydroxypropyl group | 3.0 | — | — | — |

Definition of Molecular Weight (1)

Unless particularly described otherwise, the molecular weight of the polymer according to the invention refers to a weight-average molecular weight, and a weight-average molecular weight in terms of standard styrene is measured by gel permeation chromatography (GPC). The measuring method basically is a method measured in conditions below. However, according to the polymer types, an appropriate eluant may be appropriately selected to be used.

(Condition)

Column: TOSOH TSKgel Super AWM-H is connected.

Carrier: 10 mM LiBr/N-methylpyrrolidone (Preparation Example of Solid Electrolyte Composition)

180 zirconia beads having a diameter of 5 mm were put into a zirconia 45 mL container (manufactured by Fritsch Japan Ltd.), 9.7 g of an inorganic solid electrolyte LLT (manufactured by Toshima Manufacturing Co., Ltd.), and 0.3 g of a polymer P-1 (expressed in terms of solid content) were added, 15.0 g of N-methylpyrrolidone as a dispersion medium was put, the container was set to a planetary ball mill P-7 manufactured by Fritsch Japan Ltd., and mixing was continued at the rotation speed of 300 rpm for two hours, so as to obtain a solid electrolyte composition S-1. The other exemplary solid electrolyte compositions were prepared in the same manner (Table 2).

TABLE 2

Tests by solid electrolyte sheet

| Composition | Inorganic solid electrolyte | | Polymer | | Dispersion medium |
|---|---|---|---|---|---|
| S-1 | LLT | 97.0 | P-1 | 3.0 | NMP |
| S-2 | LLZ | 97.0 | P-2 | 3.0 | NMP |
| S-3 | LLT | 97.0 | P-3 | 3.0 | NMP |
| S-4 | LLZ | 97.0 | P-4 | 3.0 | Toluene |
| S-5 | LLT | 97.0 | P-5 | 3.0 | Toluene |
| S-6 | LLT | 97.0 | P-6 | 3.0 | Toluene |
| S-7 | LLZ | 97.0 | P-7 | 3.0 | NMP |
| S-8 | LLT | 97.0 | P-8 | 3.0 | NMP |
| S-9 | LLZ | 97.0 | P-9 | 3.0 | Toluene |
| S-10 | LLT | 97.0 | P-10 | 3.0 | NMP |
| S-11 | LLT | 97.0 | P-11 | 3.0 | NMP |
| S-12 | LLZ | 97.0 | P-12 | 3.0 | Toluene |
| S-13 | LLT | 97.0 | P-13 | 3.0 | NMP |
| S-14 | LLT | 97.0 | P-14 | 3.0 | NMP |
| S-15 | LLT | 97.0 | P-15 | 3.0 | NMP |
| S-16 | LLT | 97.0 | P-16 | 3.0 | NMP |
| S-17 | LLT | 97.0 | P-17 | 3.0 | NMP |
| T-1 | LLT | 100.0 | — | — | NMP |
| T-2 | LLT | 75.0 | PEO | 23.0 | THF/NMP |

<Explanatory Notes in Table>
Numbers in the table was mass ratios (%)
LLZ: $Li_7La_3Zr_2O_{12}$
LLT: $Li_{0.33}La_{0.55}TiO_3$
PEO: Polyethylene oxide (weight-average molecular weight: 3,000)
THF: Tetrahydrofuran
NMP: N-methylpyrrolidone (Production Example of Solid Electrolyte Sheet)

The solid electrolyte composition obtained above was applied on an aluminum foil having a thickness of 20 μm with an applicator having arbitrary clearance, and heating was performed for one hour at 80° C. and further performed for one hour at 110° C., so as to dry the applied composition. Thereafter, copper plates having a thickness of 20 μm were matched, and heating and pressurizing were performed by using a heat press machine so as to have an arbitrary density, such that a solid electrolyte sheet was obtained. The film thickness of the electrolyte layer was 30 μm. Other solid electrolyte sheets were also prepared in the same method.

Preparing of Composition for Positive Electrode of Secondary Battery 100 parts of a positive electrode active substance, 5 parts of acetylene black, 75 parts of the solid electrolyte composition obtained above, and 270 parts of N-methylpyrrolidone described in Table 4 below were added to a planetary mixer (TK HIVIS mix, manufactured by PRIMIX Corporation), and stirring was performed at 40 rpm for one hour.

Preparing of Composition for Negative Electrode of Secondary Battery 100 parts of a negative electrode active substance, 5 parts of acetylene black, 75 parts of the solid electrolyte composition obtained above, and 270 parts of N-methylpyrrolidone described in Table 4 below were added to a planetary mixer (TK HIVIS mix, manufactured by PRIMIX Corporation), and stirring was performed at 40 rpm for one hour.

Producing of Positive Electrode Sheet for Secondary Battery

The composition for the positive electrode of the secondary battery obtained above was applied on an aluminum foil having a thickness of 20 μm with an applicator having arbitrary clearance, and heating was performed for 1 hour at 80° C. and further performed for 1 hour at 110° C., so as to dry the applied composition. Thereafter, heating and pressurizing were performed by using a heat press machine so as to have an arbitrary density, such that a positive electrode sheet for a secondary battery was obtained.

Producing of Electrode Sheet for Secondary Battery

The solid electrolyte composition obtained above was applied on the positive electrode for the secondary battery obtained above with an applicator having arbitrary clearance, and heating was performed for 1 hour at 80° C. and further performed for 1 hour at 110° C. Thereafter, the composition for the negative electrode of the secondary battery obtained above was applied, heating was performed for 1 hour at 80° C. and further performed for 1 hour at 110° C. A copper foil having the thickness of 20 μm was matched on the negative electrode layer, heating and pressurization were performed to have arbitrary density by using a heating and pressing machine, so as to obtain an electrode sheet for a secondary battery. The secondary battery electrode sheet had the constitution of FIG. 1. The film thicknesses of the positive electrode layer and the negative electrode layer were 80 μm, and the film thickness of the electrolyte layer was 30 μm. Other secondary battery electrode sheets were also produced in the same manner.

<Evaluation of Electrode Binding Properties>

In a step of producing a solid electrolyte sheet or a secondary electrode sheet for batteries, binding properties was evaluated by using a sheet before providing a negative electrode collector copper foil (in a state in which a solid electrolyte composition or a composition for a negative electrode was applied and dried). When an adhesive tape (cellophane tape ("CT24", manufactured by Nichiban Co., Ltd.)) was adhered to the surface of the solid electrolyte composition or the composition for the negative electrode after drying and was removed at a predetermined speed, a peeled area was visually checked. An ratio of an area in a portion which was not peeled was evaluated as below.

A: 90% or greater
B: 70% or greater and less than 90%
C: 50% or greater and less than 70%
D: Less than 50%

<Measuring of Ion Conductivity>

A coin battery was produced by cutting the solid electrolyte sheet or the secondary battery electrode sheet obtained above into a disc shape with a diameter of 14.5 mm and inputting the cut electrode sheet or the cut secondary battery electrode sheet to a stainless steel 2032-type coin case combined with a spacer or a washer. The coin battery was inserted from the outside of the coin battery in a jig that can apply a pressure between electrodes to be used in the electrochemical measurement. The pressure between the electrodes was 500 kgf/cm$^2$.

Figure 2:
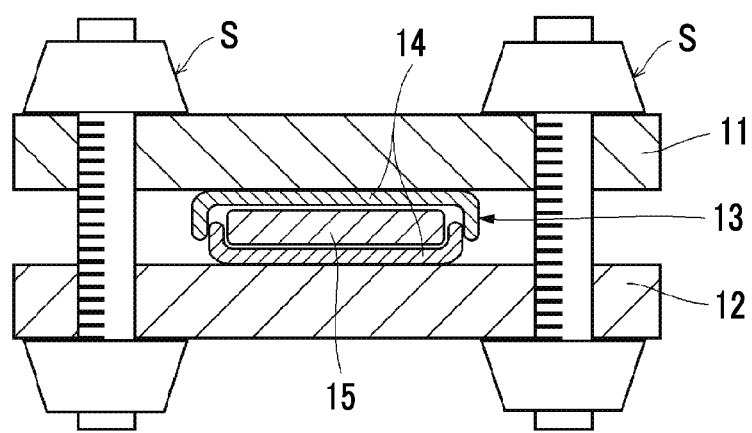
FIG. 2 is a cross-sectional view schematically illustrating a test device used in examples.

The ion conductivity was obtained by using the coin battery obtained above by the alternating current impedance method in the constant-temperature tank of 30° C. At this point, in the pressurization of the battery, the test body illustrated in FIG. 2 was used. Reference numeral 11 refers to an upper support plate, Reference numeral 12 refers to a lower support plate, Reference numeral 13 refers to a coin battery. Reference numeral 14 refers to a coin case, Reference numeral 15 refers to an electrode sheet (a solid electrolyte sheet or a secondary battery electrode sheet), and Reference numeral S refers to a screw.

The electrode binding properties of the solid electrolyte sheet, measuring results of the ion conductivity in pressurized and non-pressurized states are represented in Table 3. At this point, the measuring in the pressurized state refers to a case where the measuring was performed in a state in which the coin battery was interposed between jigs, and the measuring in the non-pressurized state refers to a case where the measuring was performed with the coin battery as it was.

TABLE 3

Tests by solid electrolyte sheet

| No. | Solid electrolyte composition | Electrode binding properties | Ion conductivity (mS/cm) Pressurized state | Non-pressurized state |
|---|---|---|---|---|
| 101 | S-1 | A | 0.15 | 0.11 |
| 102 | S-2 | A | 0.14 | 0.10 |
| 103 | S-3 | A | 0.15 | 0.11 |
| 104 | S-4 | A | 0.17 | 0.14 |
| 105 | S-5 | A | 0.14 | 0.10 |
| 106 | S-6 | A | 0.16 | 0.14 |
| 107 | S-7 | A | 0.14 | 0.09 |
| 108 | S-8 | A | 0.14 | 0.10 |
| 109 | S-9 | A | 0.16 | 0.13 |
| 110 | S-10 | A | 0.13 | 0.09 |
| 111 | S-11 | A | 0.15 | 0.11 |
| 112 | S-12 | A | 0.16 | 0.14 |
| 113 | S-13 | A | 0.15 | 0.12 |
| 114 | S-14 | B | 0.14 | 0.06 |
| 115 | S-15 | B | 0.13 | 0.07 |
| 116 | S-16 | B | 0.10 | 0.05 |
| 117 | S-17 | B | 0.10 | 0.05 |
| c11 | T-1 | D | 0.14 | 0.02 |
| c12 | T-2 | D | 0.05 | 0.02 |

<Explanatory Notes in Table>
Test No.: Test numbers starting with c are comparative examples In Table 4, measurement results of electrode binding properties of the secondary battery electrode sheet and ion conductivity thereof in pressurized and non-pressurized states are shown. The measuring in the pressurized state refers to a case where the measuring was performed in a state in which the coin battery was interposed between jigs, and the measuring in the non-pressurized state refers to a case where the measuring was performed with the coin battery as it was. In Table 4, the cell constitution is shown by describing the solid electrolyte composition and the positive electrode active substance or the negative electrode active substance, which formed respective layers.

TABLE 4

| Cell constitution No. | Composite solid Positive electrode layer | Electrolyte composition | Negative electrode layer | Electrode binding properties | Ion conductivity (mS/cm) Pressurized state | Non-pressurized state |
|---|---|---|---|---|---|---|
| 201 | LMO/S-1 | S-1 | Graphite/S-1 | A | 0.11 | 0.09 |
| 202 | LCO/S-5 | S-5 | LTO/S-5 | A | 0.10 | 0.08 |
| 203 | LMO/S-6 | S-6 | LTO/S-6 | A | 0.11 | 0.09 |
| 204 | LMO/S-9 | S-9 | LTO/S-9 | A | 0.11 | 0.10 |
| 205 | LCO/S-10 | S-10 | Graphite/S-10 | A | 0.09 | 0.07 |
| 206 | LCO/S-13 | S-13 | LTO/S-13 | A | 0.11 | 0.10 |

<Explanatory Notes in Table>
LMO; $LiMn_2O_4$ Lithium manganese oxide
LTO; $Li_4Ti_5O_{12}$ Lithium titanate
(Product name "ENERMIGHT LT-106", manufactured by Ishihara Sangyo Kaisha, Ltd.)
LCO; $LiCoO_2$ Lithium cobalt oxide As understood from the results shown in Table 3 and 4, the solid electrolyte sheet using the solid electrolyte composition according to the invention and the laminated battery had excellent electrode binding properties and excellent ion conductivity in a non-pressurized state. From this, at the time of dealing with an electrode sheet during manufacturing, the solid electrolyte layer and the electrode active substance layer were not peeled off, electrochemical contacts in solid interfaces were able to be maintained, and thus it was expected that a mechanism for pressurizing electrodes was not required and cyclability was suitable. Meanwhile, in comparative examples of T-1 that did not include the solid electrolyte composition according to the invention and T-2 that used polyethylene oxide, electrode flexibility was deteriorated, and ion conductivity in a non-pressurized state was greatly deteriorated.

A solid electrolyte composition S-15 using ethyl cellulose (P-15) synthesized above was prepared. A metal foil was coated with this, a film was formed to an electrode sheet. This electrode sheet was baked at 600° C. for one hour. Thereafter, specimens of the all-solid-state secondary batteries were produced in this manner. Evaluations as above were performed by using this specimen, binding properties were resulted to be "D", ion conductivity during pressurization was 0.15 mS/cm, and ion conductivity during non-pressurization was resulted to be unmeasurable (was not able to be measured due to generation of cracks). Even if the solid electrolyte composition in which cellulose was used in a media was used, the fact that this became in a state of not functioning as a binder by a baking treatment does not correspond to the constitution according to the invention.

The invention is described with reference to specific embodiments, but, unless described otherwise, it is clear that any details of the invention which are not particularly designated are not intended to limit the invention, and it is obvious that the embodiments are widely construed without departing from the spirit and the scope of the invention recited in the accompanying claims.

EXPLANATION OF REFERENCES

1: negative electrode collector
2: negative electrode active substance layer
3: inorganic solid electrolyte layer
4: positive electrode active substance layer
5: positive electrode collector
6: operating site
10: all-solid-state secondary battery
11: upper support plate
12: lower support plate
13: coin battery (all-solid-state secondary battery)
14: coin case
15: electrode sheet
S: screw

What is claimed is:

1. An all-solid-state secondary battery, comprising:

a positive electrode active substance layer;

a negative electrode active substance layer; and an inorganic solid electrolyte layer, wherein at least one of the positive electrode active substance layer, the negative electrode active substance layer, or the inorganic solid electrolyte layer contains an inorganic solid electrolyte having conductivity of ions of metal belonging to Group 1 or 2 of the periodic table and a cellulose polymer, wherein the cellulose polymer has a repeating unit represented by Formula (1) below,

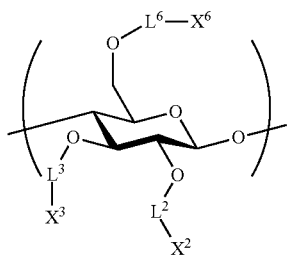
(1)

$L^2$, $L^3$, and $L^6$ each independently represent a single bond or a divalent linking group, and $X^2$, $X^3$, and $X^6$ each independently represent a hydrogen atom, a hydrocarbon group having 1 to 30 carbon atoms, a hydrocarbon group having 1 to 30 carbon atoms in which a portion or all of hydrogen atoms of the hydrocarbon group are substituted with halogen atoms, or a hydrocarbon group having 1 to 30 carbon atoms in which a hydrocarbon chain of the hydrocarbon group has an ether group or a thioether group.

2. The all-solid-state secondary battery according to claim 1, wherein the cellulose polymer has a repeating unit represented by Formula (1) below,

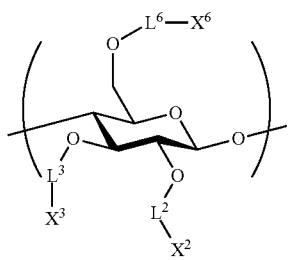
(1)

$L^2$, $L^3$, and $L^6$ each independently represent a single bond or a divalent linking group, and $X^2$, $X^3$, and $X^6$ each independently represent a hydrogen atom, or a hydrocarbon group having 1 to 30 carbon atoms.

3. The all-solid-state secondary battery according to claim 2, wherein at least one of $L^2$, $L^3$, or $L^6$ is a divalent linking group.

4. The all-solid-state secondary battery according to claim 2, wherein $L^2$, $L^3$, and $L^6$ each independently represent a single bond, a carbonyl group, a carbonyloxy group, or an amide group.

5. The all-solid-state secondary battery according to claim 1, wherein a total degree of substitution of a hydroxyl group of the cellulose polymer is 0.3 or greater.

6. The all-solid-state secondary battery according to claim 1, wherein 0.1 parts by mass to 10 parts by mass of the cellulose polymer is contained with respect to 100 parts by mass of the inorganic solid electrolyte.

7. The all-solid-state secondary battery according to claim 1, wherein the inorganic solid electrolyte layer is a layer containing the inorganic solid electrolyte and the cellulose polymer.

8. The all-solid-state secondary battery according to claim 1, wherein the negative electrode active substance layer or the positive electrode active substance layer is a layer containing the inorganic solid electrolyte and the cellulose polymer.

9. The all-solid-state secondary battery according to claim 1, wherein the inorganic solid electrolyte is an oxide-based inorganic solid electrolyte.

10. The all-solid-state secondary battery according to claim 9, wherein the inorganic solid electrolyte is selected from a compound of a formula below:

$Li_{xa}La_{ya}TiO_3$ xa=0.3 to 0.7, ya=0.3 to 0.7, $Li_7La_3Zr_2O_{12}$, $Li_{3.5}Zn_{0.25}GeO_4$, $LiTi_2P_3O_{12}$, $Li_{1+xh+yh}(Al,Ga)_{xh}(Ti,Ge)_{2-xh}Si_{yh}P_{3-yh}O_{12}$ $0 \leq xh \leq 1$, $0 \leq yh \leq 1$, $Li_3PO_4$, LiPON, $LiPOD^1$ $D^1$ is at least one type selected from Ti, V, Cr, Mn, Fe, Co, Ni, Cu, Zr, Nb, Mo, Ru, Ag, Ta, W, Pt, or Au, and $LiA^1ON$ $A^1$ is at least one type selected from Si, B, Ge, Al, C, or Ga.

11. A solid electrolyte composition comprising:

an inorganic solid electrolyte having conductivity of ions of metal belonging to Group 1 or 2 of the periodic table and a binder constituted with a cellulose polymer having a repeating unit represented by Formula (1) below,

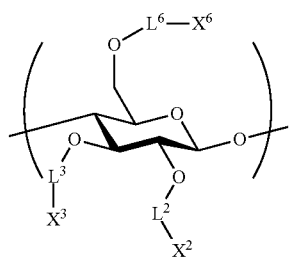
(1)

wherein $L^2$, $L^3$, and $L^6$ each independently represent a single bond or a divalent linking group, and $X^2$, $X^3$, and $X^6$ independently each represent a hydrogen atom, a hydrocarbon group having 1 to 30 carbon atoms, a hydrocarbon group having 1 to 30 carbon atoms in which a portion or all of hydrogen atoms of the hydrocarbon group are substituted with halogen atoms, or a hydrocarbon group having 1 to 30 carbon atoms in which a hydrocarbon chain of the hydrocarbon group has an ether group or a thioether group.

12. The solid electrolyte composition according to claim 11,
wherein at least one of $L^2$, $L^3$, or $L^6$ is a divalent linking group.

13. The solid electrolyte composition according to claim 11,
wherein at least one of $X^2$, $X^3$, or $X^6$ is a hydrocarbon group having 3 or more carbon atoms.

14. The solid electrolyte composition according to claim 11,
wherein $L^2$, $L^3$, and $L^6$ each independently represent a single bond, a carbonyl group, a carbonyloxy group, or an amide group.

15. The solid electrolyte composition according to claim 11, further comprising:
a dispersion medium.

16. An electrode sheet for batteries,
wherein a film is formed with the solid electrolyte composition according to claim 11, on a metal foil.

17. A manufacturing method of an electrode sheet for batteries, comprising:
forming a film by arranging the solid electrolyte composition according to claim 11, on a metal foil.

18. A manufacturing method of an all-solid-state secondary battery, comprising:
manufacturing an all-solid-state secondary battery by the manufacturing method according to claim 17.

* * * * *